United States Patent
Hudson et al.

(10) Patent No.: US 11,965,608 B2
(45) Date of Patent: Apr. 23, 2024

(54) VISION SYSTEM FOR ROTARY VALVE

(71) Applicant: Artisan Industries Inc., Stoughton, MA (US)

(72) Inventors: David A. Hudson, Stoughton, MA (US); Austin Sady, Wilbraham, MA (US)

(73) Assignee: Artisan Industries Inc., Stoughton, MA (US)

( * ) Notice: Subject to any disclaimer, the term of this patent is extended or adjusted under 35 U.S.C. 154(b) by 0 days.

(21) Appl. No.: 17/810,584

(22) Filed: Jul. 1, 2022

(65) Prior Publication Data

US 2023/0003316 A1 Jan. 5, 2023

Related U.S. Application Data

(60) Provisional application No. 63/217,815, filed on Jul. 2, 2021.

(51) Int. Cl.
*F16K 37/00* (2006.01)
*F16K 11/074* (2006.01)
(Continued)

(52) U.S. Cl.
CPC ........ *F16K 37/0058* (2013.01); *F16K 11/074* (2013.01); *F16K 31/043* (2013.01); *B01D 53/0446* (2013.01)

(58) Field of Classification Search
CPC .. F16K 37/0058; F16K 11/074; F16K 31/043; B01D 53/0446
See application file for complete search history.

(56) References Cited

U.S. PATENT DOCUMENTS 1,976,417 A * 10/1934 Steinberg ............... F16K 11/074
137/624.16
3,040,777 A * 6/1962 Carson ................ F16K 11/0743
137/625.46
(Continued)

FOREIGN PATENT DOCUMENTS

CN 112780797 A 5/2021
EP 3376080 A1 9/2018
(Continued)

OTHER PUBLICATIONS

International Search Report for PCT PCT/US22/73401, ISA/EP (European Patent Office), dated Oct. 24, 2022.
(Continued)

*Primary Examiner* — Matthew W Jellett
*Assistant Examiner* — Christopher D Ballman
(74) *Attorney, Agent, or Firm* — George Jakobsche Patent Counsel PLLC

(57) ABSTRACT

A digital camera facilitates remote visual inspection of alignment between a rotor plate and a track plate of a multi-position rotary valve. In some embodiments, a signal from the video camera is used as part of a feedback system that controls advancement of the rotor plate, to automatically align apertures in the rotor plate with apertures in a track plate. Some embodiments facilitate remote visual inspection of the condition of a seal sheet disposed between the rotor plate and the track plate, without disassembling the rotary valve. Some embodiments automatically measure remaining usable thickness of the seal sheet.

6 Claims, 17 Drawing Sheets

(51) Int. Cl.
*F16K 31/04* (2006.01)
*B01D 53/04* (2006.01)

(56) References Cited

U.S. PATENT DOCUMENTS

| | | | | |
|---|---|---|---|---|
| 3,422,848 A * | 1/1969 | Carson | ................ | F16K 11/0743 137/625.46 |
| 3,451,428 A * | 6/1969 | Pruett | ................ | F16K 11/0743 137/625.46 |
| 3,633,621 A * | 1/1972 | Myers | ................ | F16K 11/0743 251/297 |
| 4,077,424 A * | 3/1978 | Ehret | ................ | F16K 11/074 137/119.07 |
| 4,614,204 A * | 9/1986 | Dolejs | ................ | B01D 53/0446 137/625.46 |
| 4,632,149 A * | 12/1986 | Oroskar | ................ | F16K 11/074 137/625.46 |
| 4,633,904 A * | 1/1987 | Schumann | ............ | F16K 11/074 137/625.46 |
| 4,729,876 A | 3/1988 | Hennessy et al. | | |
| 4,794,952 A * | 1/1989 | Burkard | ............ | F16K 11/0787 137/625.46 |
| 5,040,569 A * | 8/1991 | Nogami | ................ | B21B 37/62 137/625.21 |
| 5,268,021 A * | 12/1993 | Hill | ................ | B01D 53/0423 95/902 |
| 6,537,451 B1 * | 3/2003 | Hotier | ................ | B01D 15/1842 210/659 |
| 6,625,824 B1 * | 9/2003 | Lutz | ................ | E04H 4/12 137/625.21 |
| 6,932,112 B2 * | 8/2005 | Bradford, III | ........ | F16K 11/074 137/554 |
| 7,363,702 B2 * | 4/2008 | Kondo | ............... | H05K 13/0061 29/742 |
| 8,008,536 B2 * | 8/2011 | Winter | ............... | B01D 15/1807 585/824 |
| 8,695,633 B2 | 4/2014 | Nowak | | |
| 8,753,430 B2 * | 6/2014 | Koski | ................ | B01D 53/0446 95/143 |
| 9,216,472 B2 * | 12/2015 | Sato | ................. | B23K 20/126 |
| 9,320,388 B2 * | 4/2016 | Storek | .................... | A47J 36/00 |
| 10,948,531 B2 * | 3/2021 | Pinney | .................... | G01S 17/50 |
| 10,961,076 B2 * | 3/2021 | Gordon | ................ | B65H 35/008 |
| 2010/0089241 A1 * | 4/2010 | Stoner | .................... | F16J 15/3448 264/261 |
| 2011/0197769 A1 * | 8/2011 | Acker | .................... | F16K 31/041 251/129.01 |
| 2012/0160355 A1 * | 6/2012 | Dahlke | ............... | F16K 99/0042 251/304 |
| 2015/0158058 A1 * | 6/2015 | Saier | .................... | F16K 11/085 137/15.04 |
| 2019/0351413 A1 * | 11/2019 | Delattre | ............ | B01L 3/502715 |
| 2020/0108386 A1 | 4/2020 | Cox-Muranami et al. | | |
| 2021/0179029 A1 * | 6/2021 | Yamauchi | ........ | F16K 31/52466 |

FOREIGN PATENT DOCUMENTS

| | | |
|---|---|---|
| JP | H10252938 A | 9/1998 |
| KR | 20110072641 A | 6/2011 |
| WO | 0042339 A1 | 7/2000 |
| WO | 2011000738 A1 | 1/2011 |
| WO | 2020003691 A1 | 1/2020 |

OTHER PUBLICATIONS

International Search Strategy for PCT PCT/US22/73401, ISA/EP (European Patent Office), dated Oct. 24, 2022.
Notification of the Transmittal of the International Search Report for PCT PCT/US22/73401, ISA/EP (European Patent Office), dated Oct. 24, 2022.
Written Opinion of the International Searching Authority for PCT PCT/US22/73401, ISA/EP (European Patent Office), dated Oct. 24, 2022.

* cited by examiner

VISION SYSTEM FOR ROTARY VALVE

CROSS REFERENCE TO RELATED APPLICATIONS

This application claims a benefit of U.S. Provisional Patent Application No. 63/217,815, filed Jul. 2, 2021, titled "Vision System for Rotary Valve," the entire contents of which are hereby incorporated by reference herein, for all purposes.

TECHNICAL FIELD

The invention relates to rotary valves, and more particularly to systems for monitoring wear and/or alignment of rotary valves.

RELATED ART

A multi-position rotary valve (also sometimes referred to as a domed rotary valve) is a large, multi-way valve, a part of which rotates intermittently among a number of discrete positions to control fluid flow, such as in a petrochemical refinery or food processing plant. A rotary valve acts as a multi-way switch among a plurality of pipes terminating at the rotary valve. The rotary valve selectively directs fluid arriving at one of the pipes to another of the pipes, depending on rotational position of a rotor plate within the rotary valve. In many embodiments, the rotor plate is on the order of two to ten feet (0.6 to 3 m) in diameter and about ½ inch to six inches (12.7 to 152 mm) thick and is made primarily of carbon steel or stainless steel. In many embodiments, the rotor plate may be rotated to any of approximately two dozen discrete positions, thereby providing that number of different fluidic interconnections among the pipes.

A circumferential misalignment between an aperture in the rotor plate and an aperture in a fixed track plate of the rotary valve would impede or prevent fluid flow. Typically, a visible target is fixed to a vertical pipe or a circumferential side surface of the rotor plate, and a sight glass in the rotary valve casing permits a technician to directly observe the target to check alignment between the rotor plate and the track plate. However, the rotor plate typically has only one target, which can therefore be checked at only one rotational position of the rotor plate. In typical operation, a rotary valve is advanced intermittently, such as about every 90 seconds. Because the alignment can be checked only once per revolution of the rotor plate, the alignment can be checked only once about every 36 minutes (assuming a 24-position rotary valve and a 90 second advancement period). Missing a window of opportunity to check the alignment may therefore require a technician to wait over half an hour to check the alignment, thereby allowing a process to run unoptimized for a long period of time.

Furthermore, wear and tear to a seal sheet disposed between the rotor plate and the track plate can prevent proper fluid control within the rotary valve. The seal sheet can be damaged by corrosion, erosion, friction, distortion, excessive heat, or by the presence of foreign objects. Once the seal sheet is damaged, either repair or replacement is necessary to reestablish an acceptable seal and better process control.

However, the working surface of the seal sheet is not visible from the sight glass and, thus, cannot be inspected via the sight glass. Instead, disassembly of the rotary valve is necessary to inspect the seal sheet. Disassembly is a costly and time-consuming process, due to the weight, size, and number of the components involved. Furthermore, disassembly necessarily involves a temporary halt in production and commensurate loss of revenue.

A better way to check and control rotor plate alignment, and a better way to check seal sheet condition, would be highly desirable.

SUMMARY OF EMBODIMENTS

An embodiment of the present invention provides a multi-position rotary valve for selectively fluidically interconnecting subsets of pipes terminating at the rotary valve. The rotary valve includes a track plate, a pressure-tight housing, and a rotor plate. The track plate defines a plurality of apertures therethrough. One side of each aperture is configured to be fluidically connected to a respective one of the pipes. The pressure-tight housing is attached to the track plate to define a volume therebetween. The rotor plate is disposed in the volume, counterfacing the track plate. The rotor plate defines a plurality of apertures therethrough. The rotor plate is configured to rotate about an axis such that, at respective rotational positions, respective sets of the apertures through the rotor plate fluidically align with respective sets of the apertures through the track plate.

A seal sheet is disposed between the track plate and the rotor plate. The seal sheet is configured to maintain fluid-tight contact therebetween. A cross-over pipe is disposed within the volume and attached to the rotor plate for rotation therewith. Each end of the cross-over pipe is fluidically connected to one side of a respective aperture through the rotor plate. A sensor is configured to detect a condition of the rotary valve.

Optionally, the sensor includes a digital camera.

Optionally, any embodiment further includes a display screen remote from the rotary valve. The display screen is communicably coupled to the sensor and is configured to display an image generated by the sensor.

Optionally, any embodiment further includes a fiducial mark configured to rotate with the rotor plate. The sensor is oriented to image the fiducial mark at at least one rotational position of the rotor plate.

Optionally, in any embodiment, the housing defines a port therethrough and the sensor is disposed to image a portion of the rotary valve through the port.

Optionally, in any embodiment, the sensor is attached to one of the pipes terminating at the rotary valve and is oriented to image a portion of the rotary valve through the one of the pipes.

Optionally, in any embodiment, the sensor is attached for rotation with the rotor plate and is oriented to image a portion of the track plate through an aperture in the rotor plate.

Optionally, in any embodiment, the condition includes rotational position of the rotor plate.

Optionally, in any embodiment, the condition includes a degree of alignment of one of the track plate apertures with one of the rotor plate apertures.

Optionally, any embodiment further includes a driver configured to rotate the rotor plate. A closed-loop controller is coupled to the sensor and to the driver and is configured to control operation of the driver in response to a signal from the sensor.

Optionally, in any embodiment that includes a driver, the sensor includes a digital camera.

Optionally, any embodiment that includes a driver further includes a fiducial mark configured to rotate with the rotor plate. The sensor is configured to detect the fiducial mark at at least one rotational position of the rotor plate.

Optionally, in any embodiment, the condition includes a thickness of the seal sheet.

Optionally, in any embodiment in which the condition includes a thickness of the seal sheet, the sensor includes a LiDAR.

Optionally, in any embodiment in which the condition includes a thickness of the seal sheet, the sensor includes an ultrasonic distance sensor.

Optionally, in any embodiment in which the condition includes a thickness of the seal sheet, the sensor includes a digital camera.

Optionally, in any embodiment in which the condition includes a thickness of the seal sheet, the embodiment further includes a processor. The processor is configured to receive a signal from the sensor. The processor is configured to automatically calculate, from the signal from the sensor, a distance between the sensor and a portion of the seal sheet. The processor is configured to automatically estimate the thickness of the seal sheet from the distance.

Optionally, in any embodiment in which the condition includes a thickness of the seal sheet, the embodiment further includes a processor. The processor is configured to receive signals from the sensor. The processor is configured to automatically calculate, from the signals, a first distance between the sensor and a first portion of the seal sheet and a second distance between the sensor and another portion of the rotary valve. The processor is configured to automatically estimate the thickness of the seal sheet from a difference between the first distance and the second distance.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Embodiments of the present invention provide apparatus and methods for remote inspection of alignment between a rotor plate and a track plate of a multi-position rotary valve via a video camera or other sensor. In some embodiments, a signal from a video camera or other sensor is used as part of a feedback system that controls advancement of the rotor plate, to automatically align apertures in the rotor plate with apertures in the track plate. Some embodiments facilitate remote inspection and/or automatic analysis of the condition of the seal sheet, without disassembling the rotary valve.

Multi-Position Rotary Valve

Figure 1:
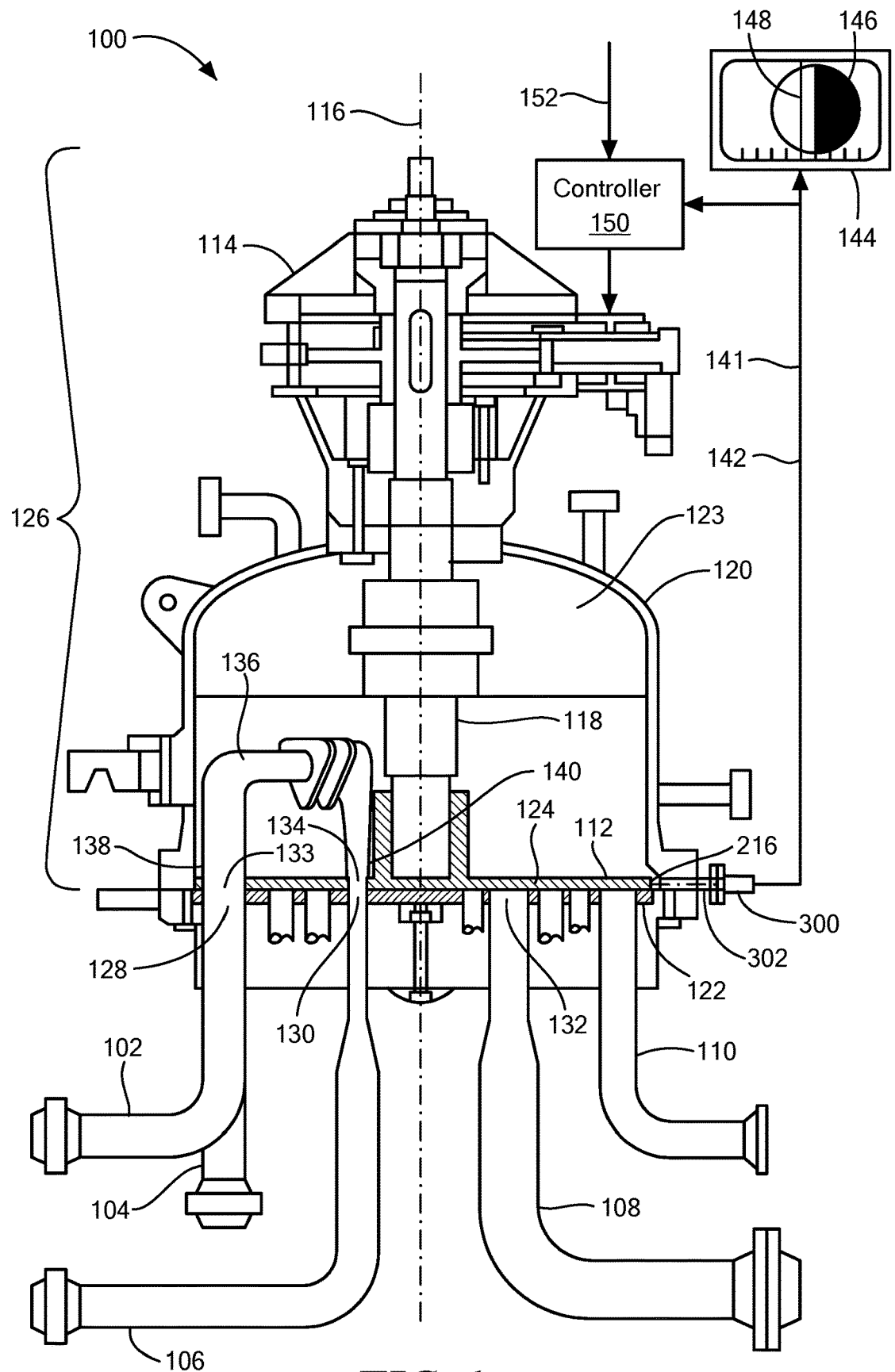
FIG. 1 is a cut-away, partially schematic illustration of a multi-position rotary valve with a system for monitoring alignment of components, according to an embodiment of the present invention.

FIG. 1 is a cut-away view of a multi-position rotary valve 100. The rotary valve 100 acts as a large multi-way switch among a plurality of pipes, exemplified by pipes 102, 104, 106, 108 and 110, terminating at the rotary valve 100. The rotary valve 100 selectively directs fluid arriving at one of the pipes 102-110 to one or more other of the pipes 102-110, depending on rotational position of a rotor plate 112 within the rotary valve 100. The rotor plate 112 may be rotated by a driver 114 about an axis 116 to, in many embodiments, any of approximately two dozen discrete positions, thereby providing that number of different fluidic interconnections among the pipes 102-110. Other embodiments have other numbers of rotational positions of the rotor plate 112. The driver 114 may include a gearbox, a ratchet driven by a hydraulic cylinder, an electromechanical cylinder or any other suitable mechanical motivator. The driver 114 is mechanically coupled to the rotor plate 112 by a shaft 118.

The rotary valve 100 includes an upper pressure-tight housing 120 detachably attached to a fixed track plate 122. Collectively, the housing 120 and the track plate 122 define a volume 123 therebetween. The rotor plate 112 is disposed in the volume 123, within the housing 120. The rotor plate 112 is parallel to, and in fluid-tight contact with, the track plate 122.

The rotor plate 112 may be maintained in fluid-tight contact with the track plate 122 by a seal sheet 124 between the rotor plate 112 and the track plate 122. In some embodiments, the seal sheet 124 is attached to the bottom surface of the rotor plate 112, such as by a plurality of segmented washers and screws. In some embodiments, the seal sheet 124 is attached to the top surface of the track plate 122, such as by a plurality of annular rings, washers and screws. Regardless of presence or absence of the seal sheet 124, or any other material between the rotor plate 112 and the track plate 122, as used herein, the rotor plate 112 is considered to be in fluid-tight contact with the track plate 122.

The rotor plate 112 rotates in a horizontal plane, about the axis 116. If an internal component becomes damaged or needs to be inspected, repaired or replaced, the housing 120 can be detached from the track plate 122, and a top head assembly 126 of the rotary valve 100 can be withdrawn from the track plate 122.

For simplicity of explanation, it is assumed herein that the rotary valve 100 is oriented such that the rotor plate 112 axis 116 of rotation is vertical, the housing 120 is at the top of the rotary valve 100, and "top view" refers to a view down along or parallel to the rotor plate axis 116, toward the housing 120.

Figure 17:
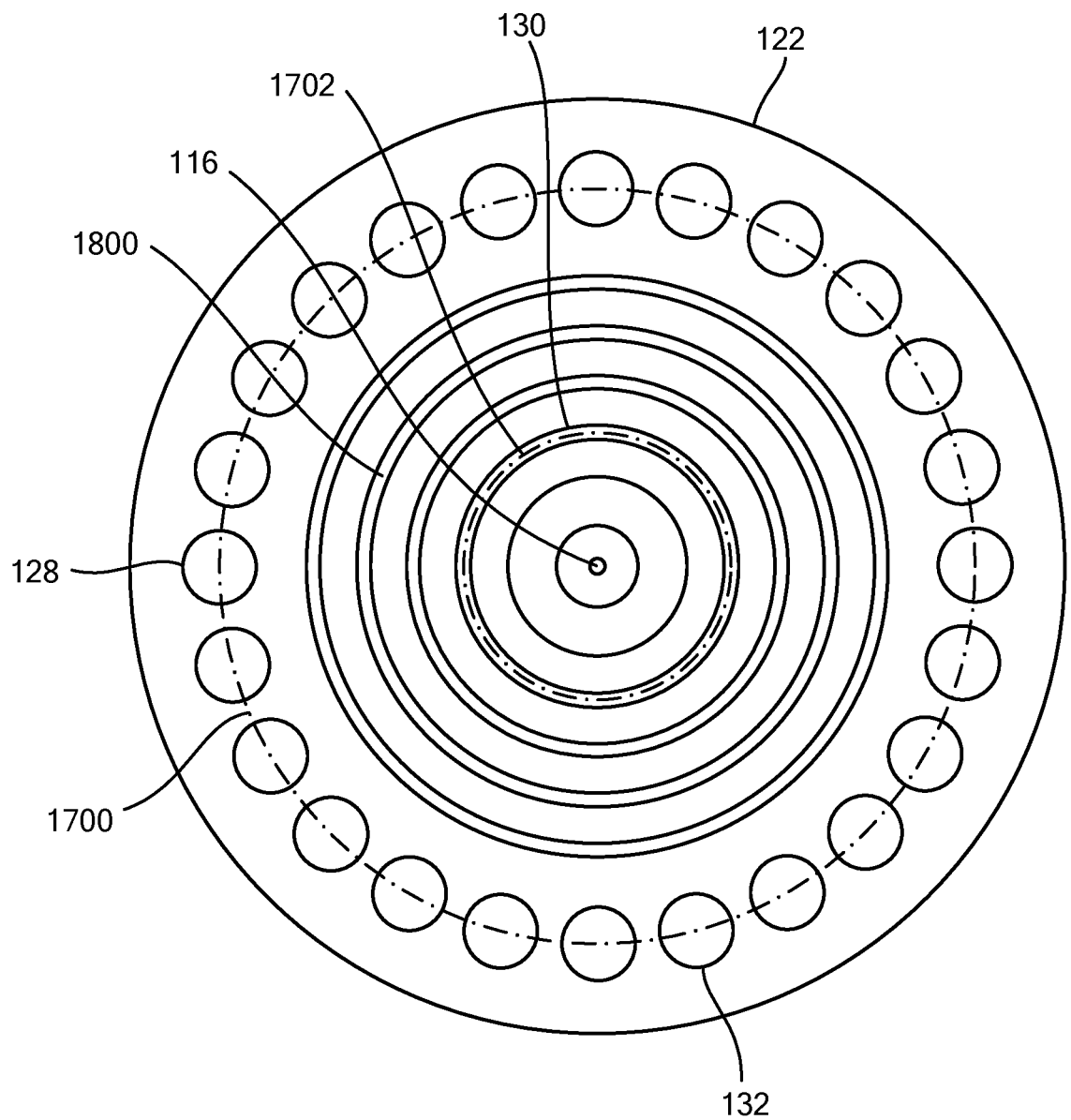
FIG. 17 is a top view of a track plate of FIG. 1, according to the prior art.
Figure 18:
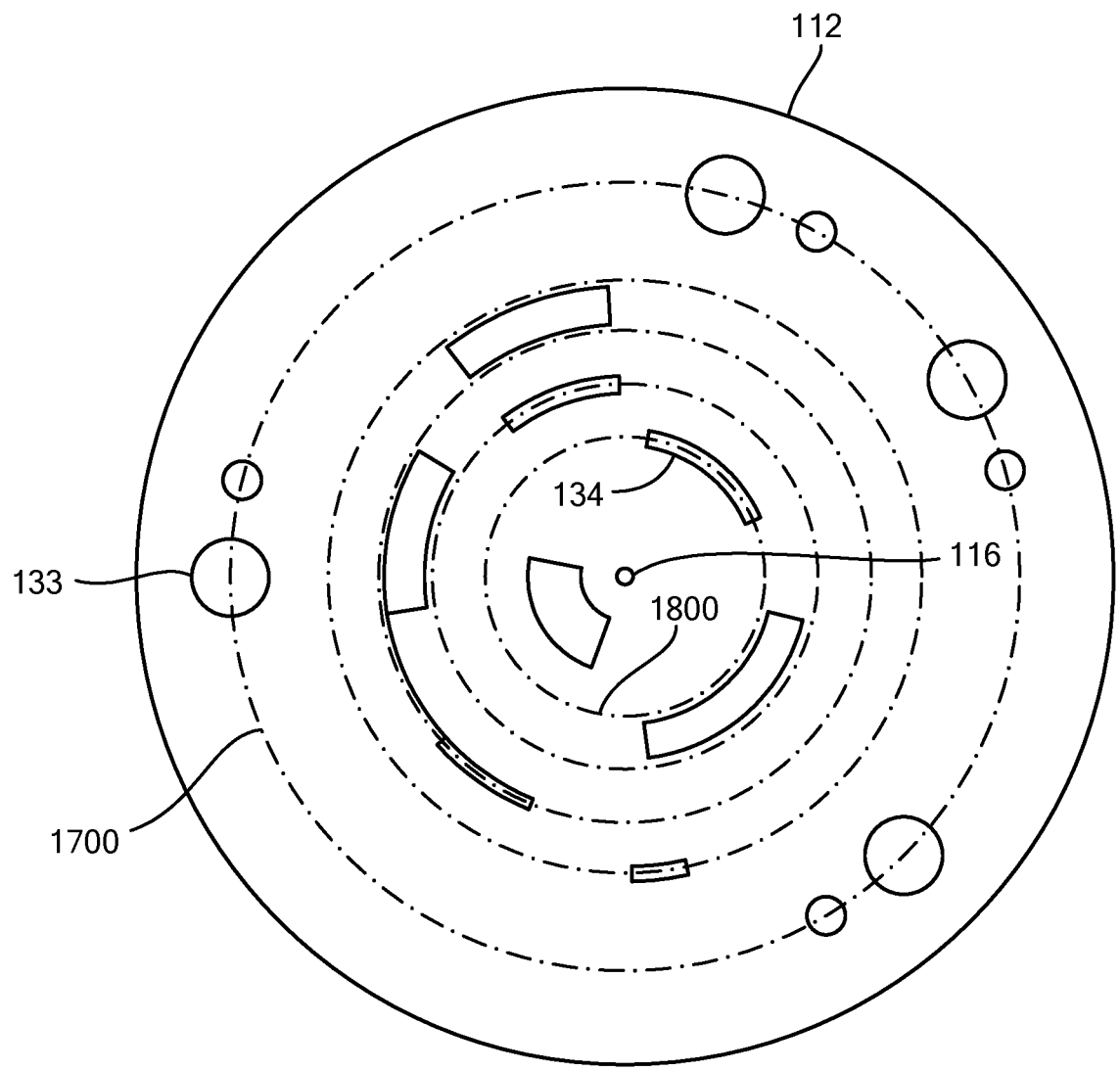
FIG. 18 is a bottom view of the rotor plate of FIG. 1, according to the prior art.
Figure 19:
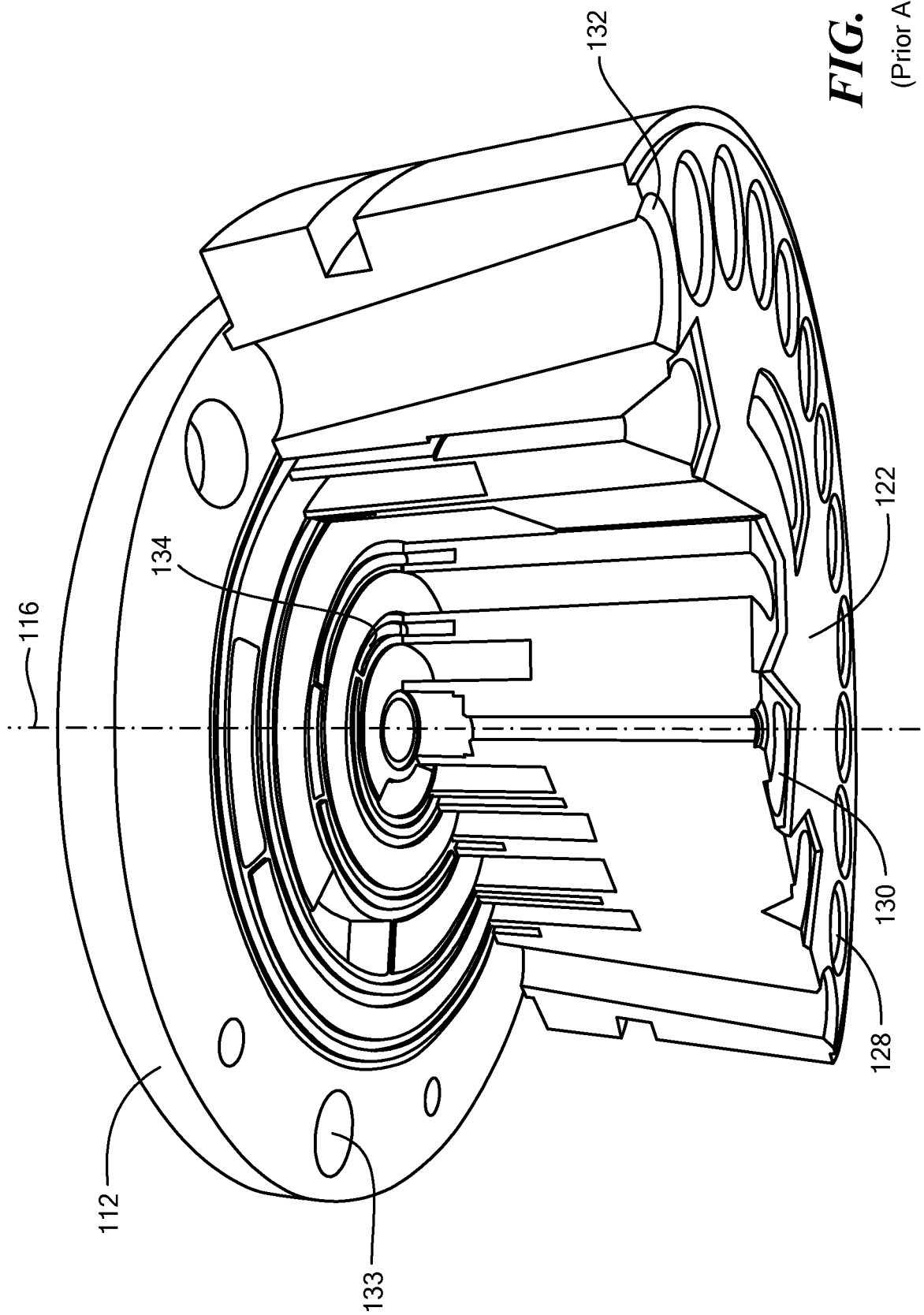
FIG. 19 is a perspective view of the bottom of the rotor plate of FIGS. 1 and 18 atop a cut-away portion of the track plate of FIGS. 1 and 17, according to the prior art.

FIG. 17 is a top view of an exemplary track plate 122, FIG. 18 is a bottom view of an exemplary rotor plate 112, and FIG. 19 is a perspective view of the bottom of the rotor plate 112 of FIG. 19 atop a cut-away portion of the track plate 122 of FIG. 17.

The track plate 122 defines a plurality of apertures therethrough, exemplified by apertures 128, 130 and 132, best seen in FIGS. 1, 17 and 19. Respective apertures 128-132 are disposed along one or more imaginary circles centered on the axis 116. In the embodiment shown in FIG. 17, the apertures 128 and 132 are centered on an imaginary circle 1700, which itself is centered on the axis of rotation 116. In the embodiment shown in FIG. 17, the apertures 128 and 132 are circular in cross section, although in other embodiments, the apertures 128 and 132 can be other shapes and need not necessarily all be the same shape or size or all centered on the same imaginary circle. In the embodiment shown in FIG. 17, the aperture 130 includes an annular trench, centered on an imaginary circle 1702, which is itself centered on the axis of rotation 116. In some embodiments, some of the apertures in the track plate 122 include less than full circular sectors of annular trenches (not shown).

Returning to FIG. 1, a bottom side of each aperture 128-132 is configured to be fluidically connected to a respective one of the pipes 102-110. For example, one end of pipe 102 is fluidically coupled to a bottom side of aperture 128, and one end of pipe 106 is fluidically coupled to a bottom side of the annular trench of aperture 130. The pipes 102-110 may be attached to the track plate 122 by any suitable means, such as by respective welds.

As can be seen in FIG. 18, the rotor plate 112 also defines a plurality of apertures therethrough, exemplified by apertures 133 and 134. In a bottom view, some of the rotor plate 112 apertures, for example aperture 133, are positioned along the imaginary circles, such as circle 1700, along which the track plate 122 (FIG. 1) apertures 128 and 130 are defined. The rotor plate 112 can also define arcuate (annular sector) apertures, exemplified by the aperture 134. These arcuate apertures 134 are disposed along imaginary circles, exemplified by circle 1800, which vertically align with center lines, exemplified by center line 1702, of the annular trenches, exemplified by aperture 130, in the track plate 122 (FIG. 17). Therefore, at certain rotational positions of the rotor plate 112, some or all of the rotor plate apertures 133-134 vertically align with respective subsets of the track plate 122 apertures 128-132. At different rotational positions, the rotor plate 112 apertures 133-134 vertically align with different subsets of the track plate 122 apertures 128-132. Some of the rotor plate apertures, such as aperture 134, align with respective apertures, such as the trench of aperture 130, at all rotational positions of the rotor plate 112.

As shown in FIG. 1, a cross-over pipe 136 is disposed within the volume 123 and is attached to the rotor plate 112 for rotation therewith. Each end 138 and 140 of the cross-over pipe 136 is fluidically connected to an upper side of a respective aperture 133 and 134 through the rotor plate 112.

The rotor plate 112 is configured to rotate about the axis 116 such that at respective rotational positions, respective sets of the apertures 133-134 through the rotor plate 112 align, i.e., vertically register, with respective sets of the apertures 128-132 through the track plate 122. For example, in the rotor plate 112 position shown in FIG. 1, the aperture 133 in the rotor plate 112 aligns with the aperture 128 in the track plate 122. The aperture 134 (FIG. 18) in the rotor plate 112 always aligns with the aperture 130 (FIG. 17) in the track plate 122, because the aperture 130 in the track plate 122 extends along an entire circle 1702. Therefore, in the rotor plate 112 position shown in FIG. 1, the pipe 102 that terminates at the bottom of the aperture 128 in the track plate 122 is fluidically coupled, in sequence, via the apertures 128 and 133, the cross-over pipe 136, and the apertures 134 and 130, to the pipe 106. In the rotor plate 112 position shown in FIG. 1, other pipes, for example pipes 108 and 110, are capped off by the rotor plate 112.

Figure 2:
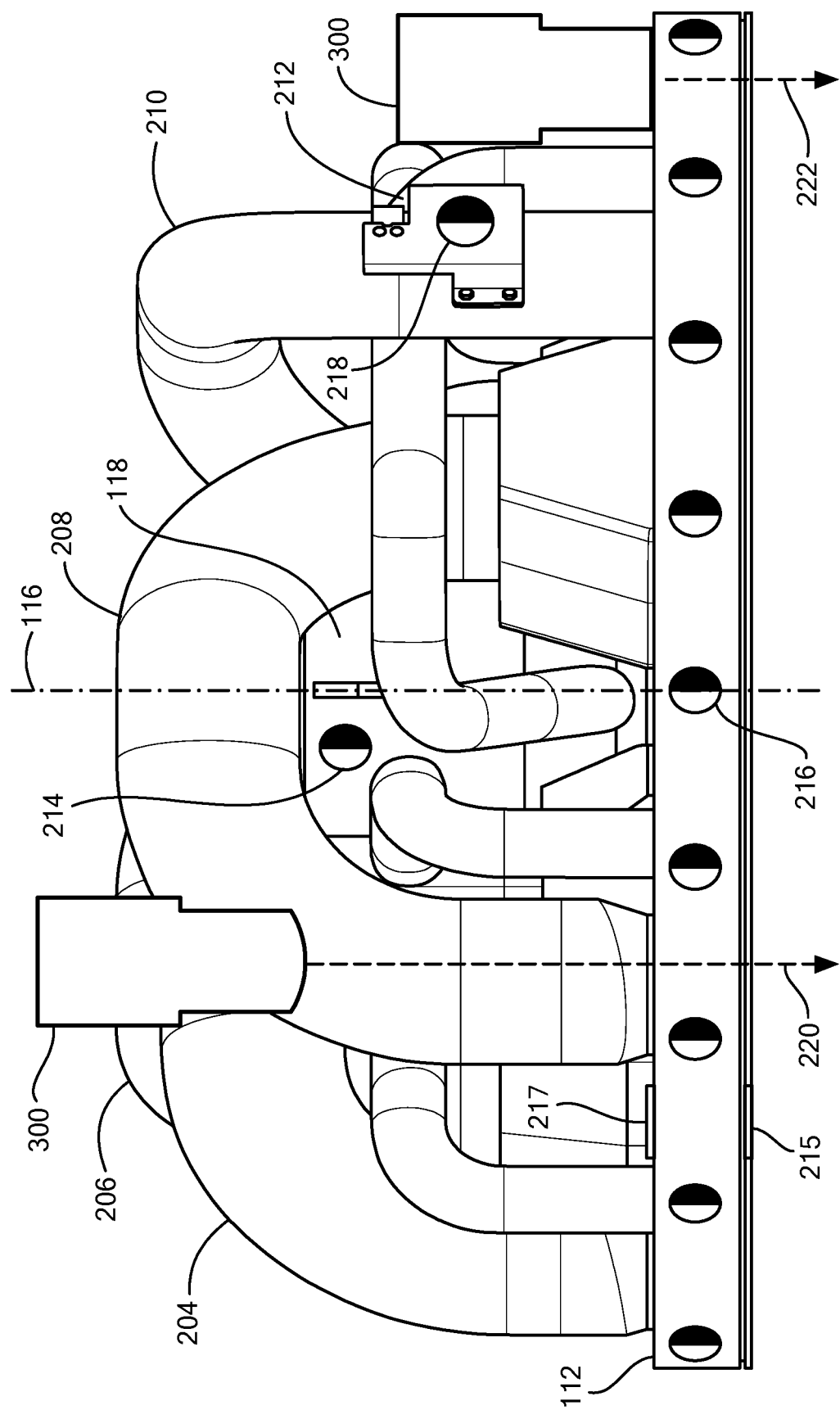
FIG. 2 is a side view of a rotor plate of the multi-position rotary valve of FIG. 1 showing several possible placements of one or more fiducial marks, according to respective embodiments of the present invention.

Although FIG. 1 shows a single cross-over pipe 136, other embodiments may include additional cross-over pipes. For example, FIG. 2 is a side view of a rotor plate 112 with several cross-over pipes, exemplified by cross-over pipes 204, 206, 208, 210 and 212, attached thereto. In such embodiments, the rotor plate 112 defines additional apertures therethrough. Although FIG. 1 shows a cross-over pipe 136 having two ends, in other embodiments, a cross-over pipe may include three or more ends, each fluidically coupled to a respective aperture through the rotor plate 112. For example, a three-ended cross-over pipe may form an E-shaped manifold.

As noted, a vertical misalignment between an aperture in the rotor plate 112 and an aperture in the track plate 122 would impede or prevent fluid flow. For example, at the rotary position of the rotor plate 112 shown in FIG. 1, a misalignment of apertures 133 and 128 would impede or prevent fluid flow. As noted, in prior art rotary valves, the alignment of the rotor plate 112 and the track plate 122 can be checked by eye only once per revolution of the rotor plate 112.

Vision System for Remote Inspection of Alignment

In some embodiments, for example as shown in FIG. 2, the rotor plate 112 includes one or more fiducial marks, exemplified by fiducial marks 214, 215, 216, 217 and 218. Some embodiments include a digital camera or other suitable sensor 300 (FIG. 3) configured to image the fiducial mark(s) 214-218. In some embodiments, the digital camera or other sensor or a controller coupled thereto is configured to detect the fiducial mark(s) and, thereby, automatically detect when the rotor plate 112 is in a position in which at least some of the apertures 133-134 in the rotor plate 112 are well aligned with apertures 128-132 in the track plate 122 (FIG. 1).

In some embodiments, the fiducial mark(s) 216 is(are) on a circumferential surface of the rotor plate 112. In some embodiments, the fiducial mark(s) 215 or 217 is(are) attached to a surface perpendicular to the axis 116. In some embodiments, the fiducial mark(s) 218 is(are) attached to one of the cross-over pipes 210. In some embodiments, the fiducial mark(s) 214 is(are) attached to another portion of the rotor plate 112 or to another component that rotates with the rotor plate 112, such as the shaft 118. In any case, the fiducial mark(s) 214-218 is(are) attached for rotation with the rotor plate 112.

In some embodiments, the rotor plate 112 has as many fiducial marks 214-218 as the rotor plate 112 has rotary positions. Preferably, each fiducial mark 214-218 is positioned to correspond with a rotational position of the rotor plate 112 in which respective apertures 133-134 in the rotor plate 112 are well aligned with corresponding apertures 128-132 in the track plate 122.

Figure 3:
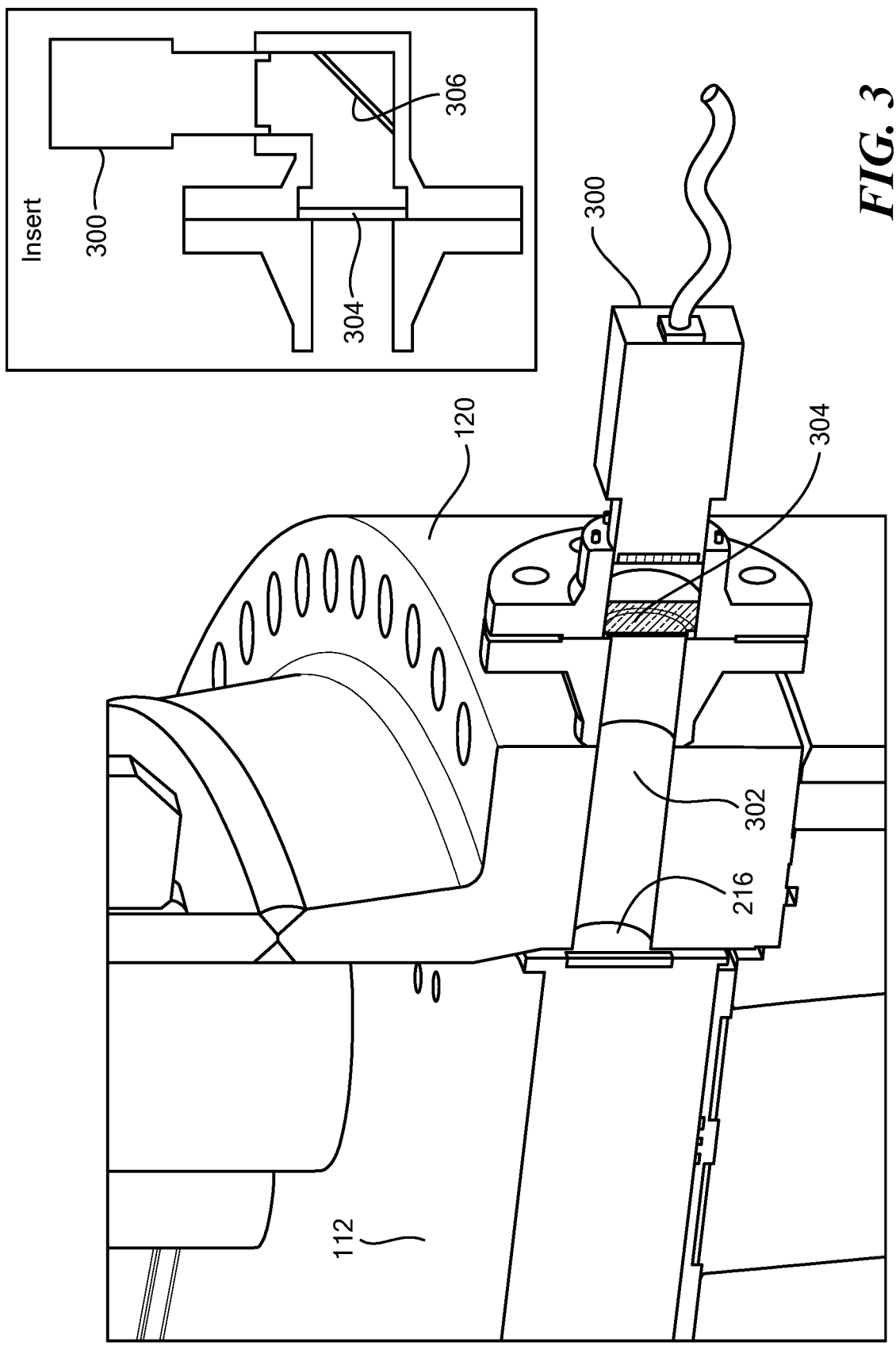
FIG. 3 is a cut-away close-up view of a portion of the multi-position rotary valve of FIG. 1 showing placement and attachment of a camera or other sensor configured to detect one of the fiducial marks of FIG. 2 via a port, according to an embodiment of the present invention.

The digital camera or other sensor 300, optionally with a light, such as a white light or a (visible or invisible) laser (not shown), is configured for attachment to the rotary valve 100. FIG. 3 shows a digital camera 300 attached to an outside surface of the housing 120 of the rotary valve 100, via a port 302 through the housing 120, according to one such embodiment. For simplicity of explanation, embodiments having a digital camera are described. However, other suitable sensors may be used. For example, for a fiducial with sufficient contrast, such as a black and white fiducial, a simple light sensor may be used as the sensor.

The port 302 may include a sight glass 304. In the embodiment shown in FIG. 3, the digital camera 300 is disposed and oriented to image the fiducial mark(s) 216 on the circumferential surface of the rotor plate 112, via the port 302. This embodiment is also shown in the lower portions of FIGS. 4 and 5. In any embodiment, a mirror 306 may fold an optical path to the camera 300, for example as shown in an insert in FIG. 3.

Figure 5:
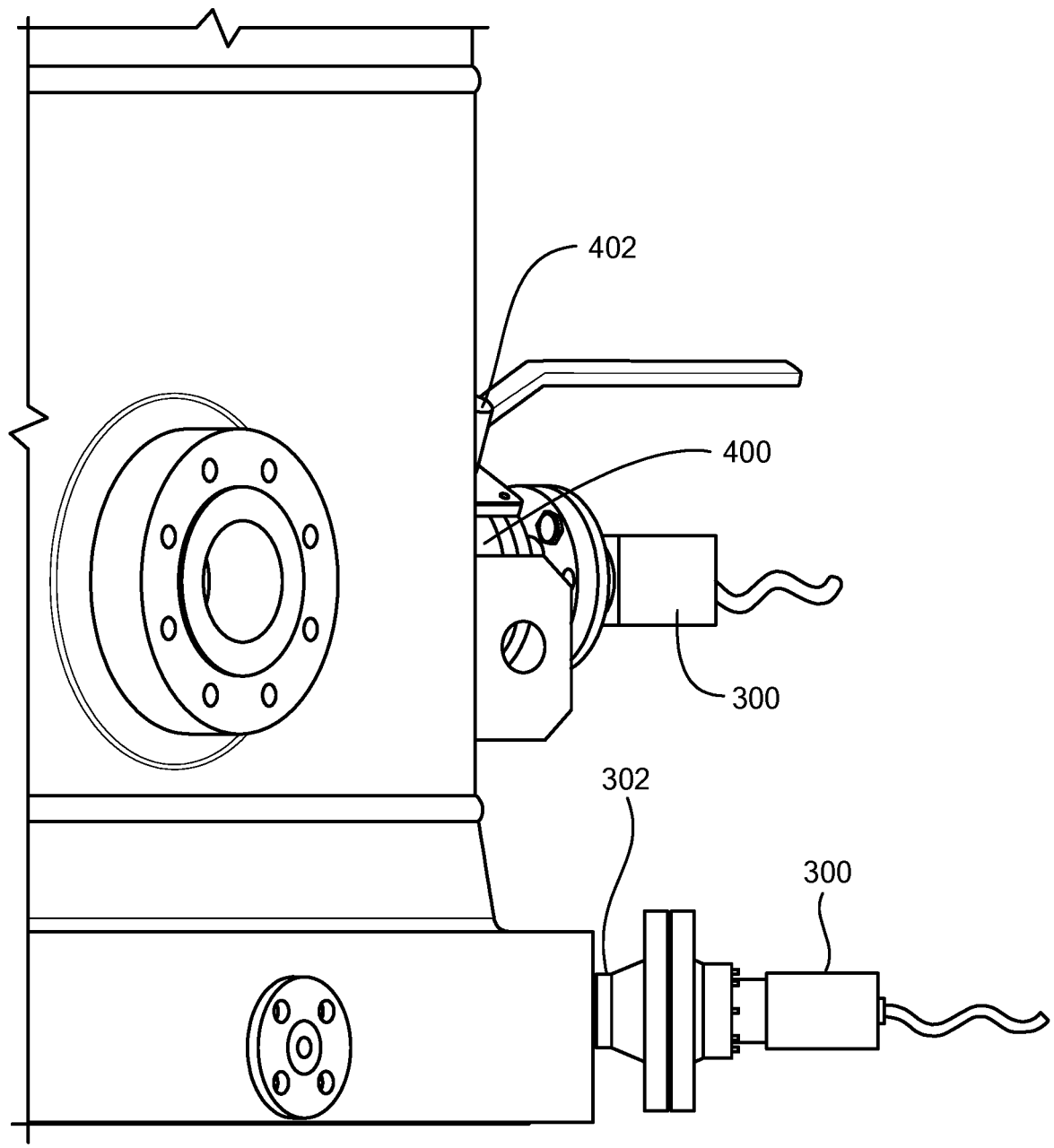
FIG. 5 is a perspective close-up view of a portion of FIG. 4 showing two possible placements and attachments of the camera or other sensor, according to respective embodiments of the present invention.
Figure 6:
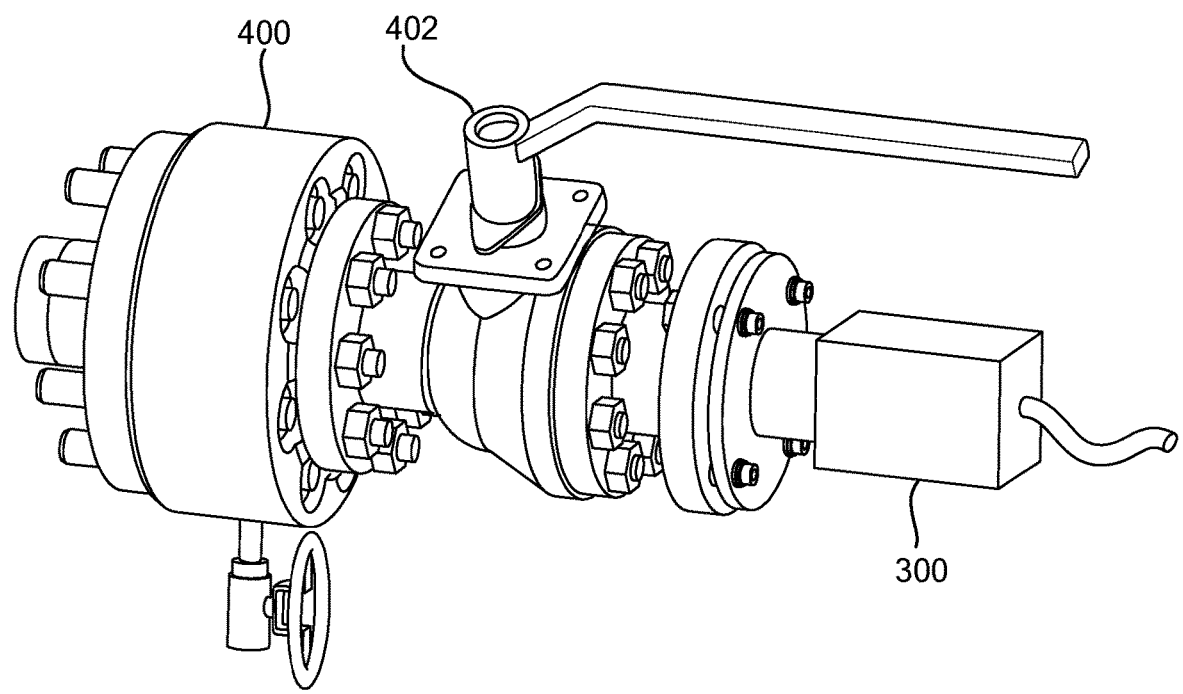
FIG. 6 is a perspective upper side view of the sight glass and camera of the upper embodiments of FIGS. 4 and 5, according to an embodiment of the present invention.
Figure 7:
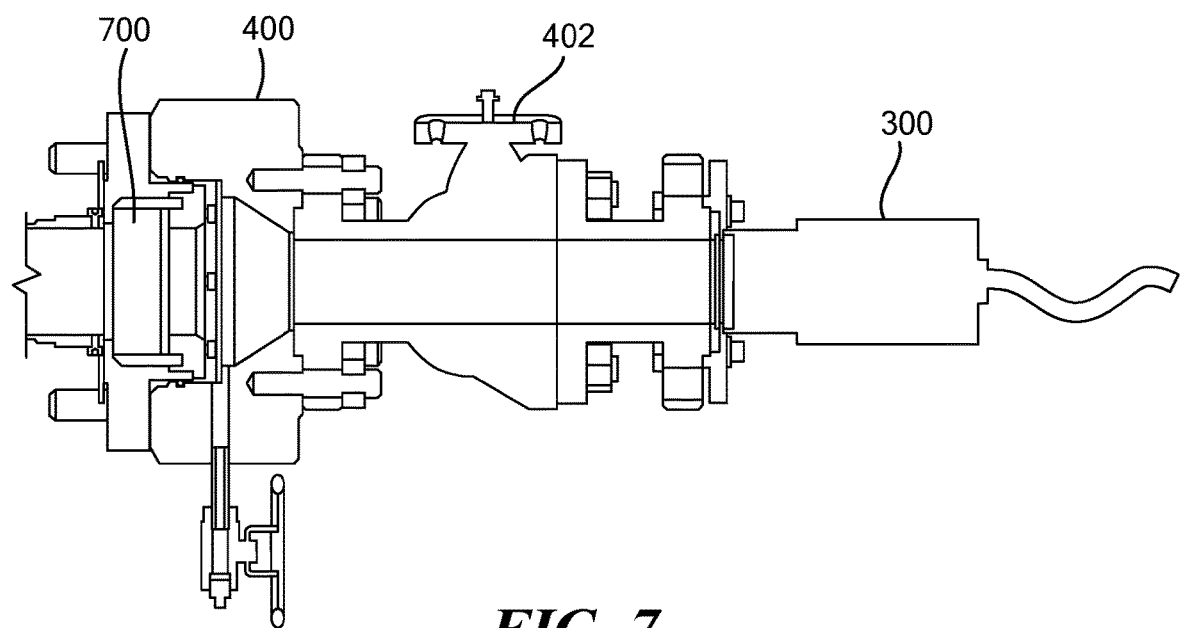
FIG. 7 is a cut-away side view of the sight glass and camera or other sensor of FIG. 6, according to an embodiment of the present invention.

In some other embodiments, the digital camera 300 is disposed and oriented to image the fiducial mark(s) 218 on a cross-over pipe, such as cross-over pipe 210 (FIG. 2). The upper-right portion of FIG. 4 and the upper portion of FIG. 5 illustrate such an embodiment, in which the digital camera 300 is attached to the outside surface of the housing 120 of the rotary valve 100 via a port and sight glass adapter 400 through the housing 120. In these embodiments, the digital camera 300 is disposed and oriented to image the fiducial mark(s) 218 on the cross-over pipe 210, via the port and sight glass adapter 400. For clarity, FIG. 6 is a perspective view of the digital camera 300 and the sight glass adapter 400, separate from the housing 120. FIG. 7 is a cross-sectional view of the digital camera 300 and the sight glass adapter 400 of FIG. 6. The sight glass adapter 400 may include a sight glass 700 and/or a shut-off valve 402.

Figure 4:
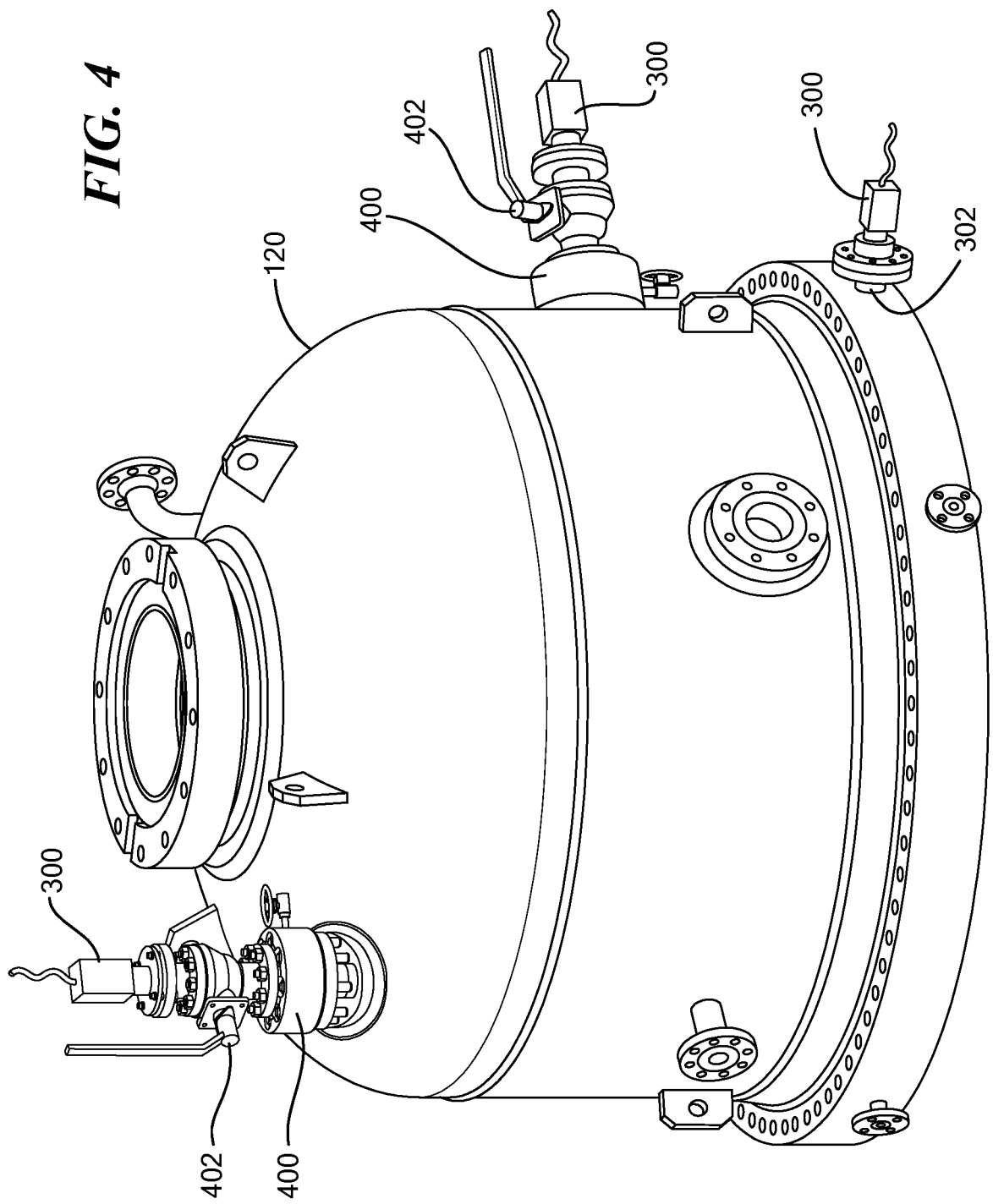
FIG. 4 is a perspective view of a housing of the multi-position rotary valve of FIG. 1 showing several possible placements and attachments of the camera or other sensor via respective ports and sight glasses and configured to detect the fiducial mark(s) of FIG. 2 or 3, respectively, according to respective embodiments of the present invention.

In some embodiments, for example as shown in the upper-left portion of FIG. 4, the digital camera 300 is disposed and oriented vertically to image the fiducial mark(s) 217 (FIG. 2).

In any case, the digital camera 300 is oriented to image the fiducial mark(s) 214-218 at at least one rotational position of the rotor plate 112. As noted, preferably, each fiducial mark 214-218 is positioned to correspond with a respective rotational position of the rotor plate 112 at which respective apertures 133-134 in the rotor plate 112 are well aligned with corresponding apertures 128-132 in the track plate 122. Preferably, the digital camera 300 is oriented to image one of the fiducial marks 214-218 at each rotational position of the rotor plate 112 where a respective desired set of the apertures 133-134 in the rotor plate 112 is well aligned with a corresponding desired set of the apertures 128-132 in the track plate 122.

Referring again to FIG. 2, in some embodiments, the digital camera 300 is connected to one of the cross-over pipes, such as cross-over pipe 208, and oriented to image the track plate 122 through the cross-over pipe 208, as indicated by arrow 220. In some embodiments, the digital camera 300 is attached directly to the rotor plate 112 and configured to image the track plate 122 through an aperture (not shown) defined through the rotor plate 112, as indicated by arrow 222. In such embodiments, a rotary electrical connector may be used to convey a signal from the digital camera, despite rotation of the rotor plate 112.

Referring again to FIG. 1, in some embodiments, the digital camera 300 (here representing any disposition or orientation of the camera 300, such as those described herein) supplies a video signal 141 via a cable or wirelessly, including via a computer network or internet (collectively represented by a signal path 142), to a display screen 144. The display screen 144 is configured to display an image 146, such as an image of the fiducial mark 214-218. The display screen 144 may be remote from the rotary valve 100. For example, the display screen 144 can be disposed in a control room or at a different facility from the rotary valve 100. The display screen 144 can be configured to also display a reticle 148 to facilitate the operator or technician evaluating alignment of the rotor plate 112 with the track plate 122. An operator or technician can easily observe the display screen 144, without venturing out to the rotary valve 100.

Automatic Feedback Controller

In some embodiments, the signal 141 from the sensor, such as the video signal from the camera 300, is provided to a closed-loop feed-back controller 150, which uses the signal 141 to control movement of the driver 114. In some embodiments, the controller 150 uses the signal 141 to automatically cause the driver 114 to advance the rotor plate 112 a predetermined rotational angle or so the fiduciary mark aligns with the reticle which, presumably, was selected such that the apertures in rotor plate 112 align well with apertures in the track plate 122.

In some embodiments, the controller 150 periodically activates the driver 114 to advance the rotor plate 112 to a next rotational position. The next rotational position can, but need not necessarily, be an adjacent rotational position. In other words, there may be one or more possible rotational positions (in which a set of apertures 132-134 in the rotor plate 112 align with a set of apertures 128-132 in the track plate 122) between a current rotational position and the next rotational position of the rotor plate 112. In some embodiments, the controller 150 receives a signal 152 from an operator or another system (not shown) and, in response to the signal 152, activates the driver 114 to advance the rotor plate 112 to a next rotational position or to a rotational position specified by the signal 152. In either case, the controller 150 uses the signal 141 to cause the driver 114 to advance the rotor plate 112 a predetermined rotational angle or so the fiduciary mark aligns with the reticle which, presumably, was selected such that the apertures in rotor plate 112 align well with apertures in the track plate 122.

Figure 8:
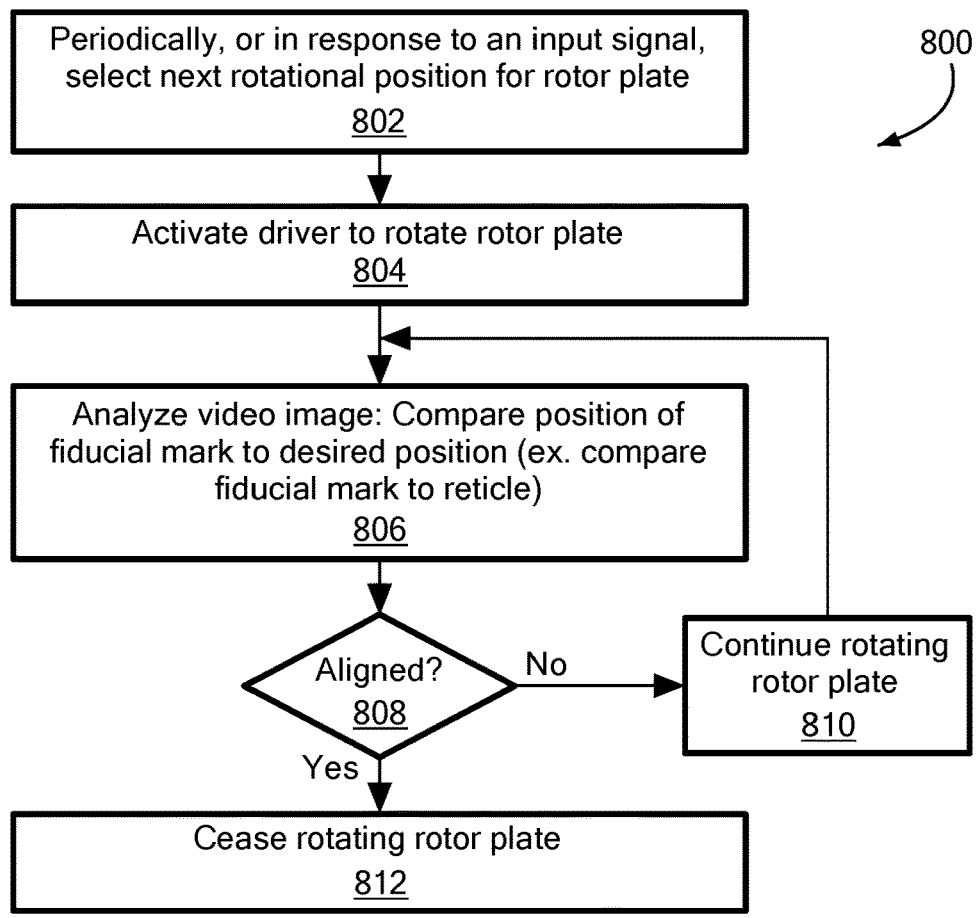
FIG. 8 is a flowchart that schematically illustrates operation of a controller of FIG. 1, according to an embodiment of the present invention.

FIG. 8 contains a flowchart that schematically illustrates operation 800 of the controller 150, according to an embodiment. At 802, periodically, or in response to the signal 152, the controller 150 selects the next rotational position for the rotor plate 112. In some cases, the next rotational position is the next rotationally adjacent position of the rotor plate 112. In some cases, the controller 150 stores in a memory a list of rotational positions, and the controller 150 steps through the list of rotational positions. In some embodiments, the signal 152 specifies the next rotational position.

At 804, the controller 150 activates the driver 114 to rotate the rotor plate 112. At 806, the controller 150 analyzes a video image 141 from the camera 300 or other sensor to compare a current position of a fiducial mark 214-218 in the image to a desired position of the fiducial mark 214-218. For example, the controller 150 may compare the position of the fiducial mark 214-218 to the reticle 148 (FIG. 1) or a position where the reticle 148 would be displayed to a human user.

If the imaged fiducial mark 214-218 is not in the desired position, i.e., if the rotor plate 112 is not well aligned with the track plate 122, control passes to 810, where the rotor plate 112 continues rotating. However, if the rotor plate 112 is well aligned with the track plate 122, control passes to 812, where rotation of the rotor plate 112 ceases.

Figure 9:
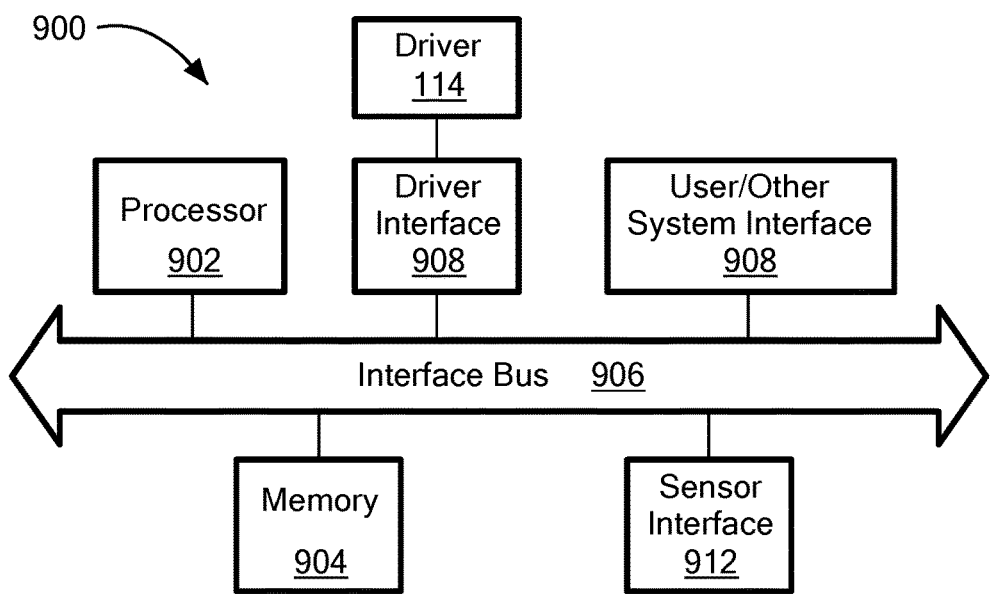
FIG. 9 is a block diagram that schematically illustrates components of the controller of FIGS. 1 and 8, according to an embodiment of the present invention.

The controller 150 can be implemented by a processor that fetches and executes instructions stored in a memory. A schematic block diagram of one such embodiment 900 of the controller 150 is shown in FIG. 9. A processor 902 is communicably coupled to a memory 904 via an interface bus 906. The memory 904 is configured to store data and instructions. The processor 902 fetches and executes the instructions from the memory 904. The processor 902 also operates on the data stored in the memory 904. A suitable driver interface 908 is coupled via the interface bus 906 to the processor. A suitable user interface 910, such as a keyboard, mouse and display screen, and/or a suitable interface to another system, such as a computer network interface, is also coupled to the processor 902 via the interface bus 906. A suitable sensor interface 912 couples the camera 300 or other sensor to the interface bus 906, to enable the processor 902 to receive the signals 141 from the camera 300 or other sensor.

Thus, the controller 150 (FIG. 1) is configured to cause the driver 114 to rotate the rotor plate 112 to a next one of a plurality of predefined positions. The controller 150 is configured to automatically ascertain a rotational position of the rotor plate 112 from an image from the digital camera 300. The controller 150 is coupled to the sensor (such as the camera 300) and to the driver 114 and configured to control operation of the driver 114 in response to a signal from the sensor.

Rotor Plate Visual Inspection and/or Alignment System

Figure 10:
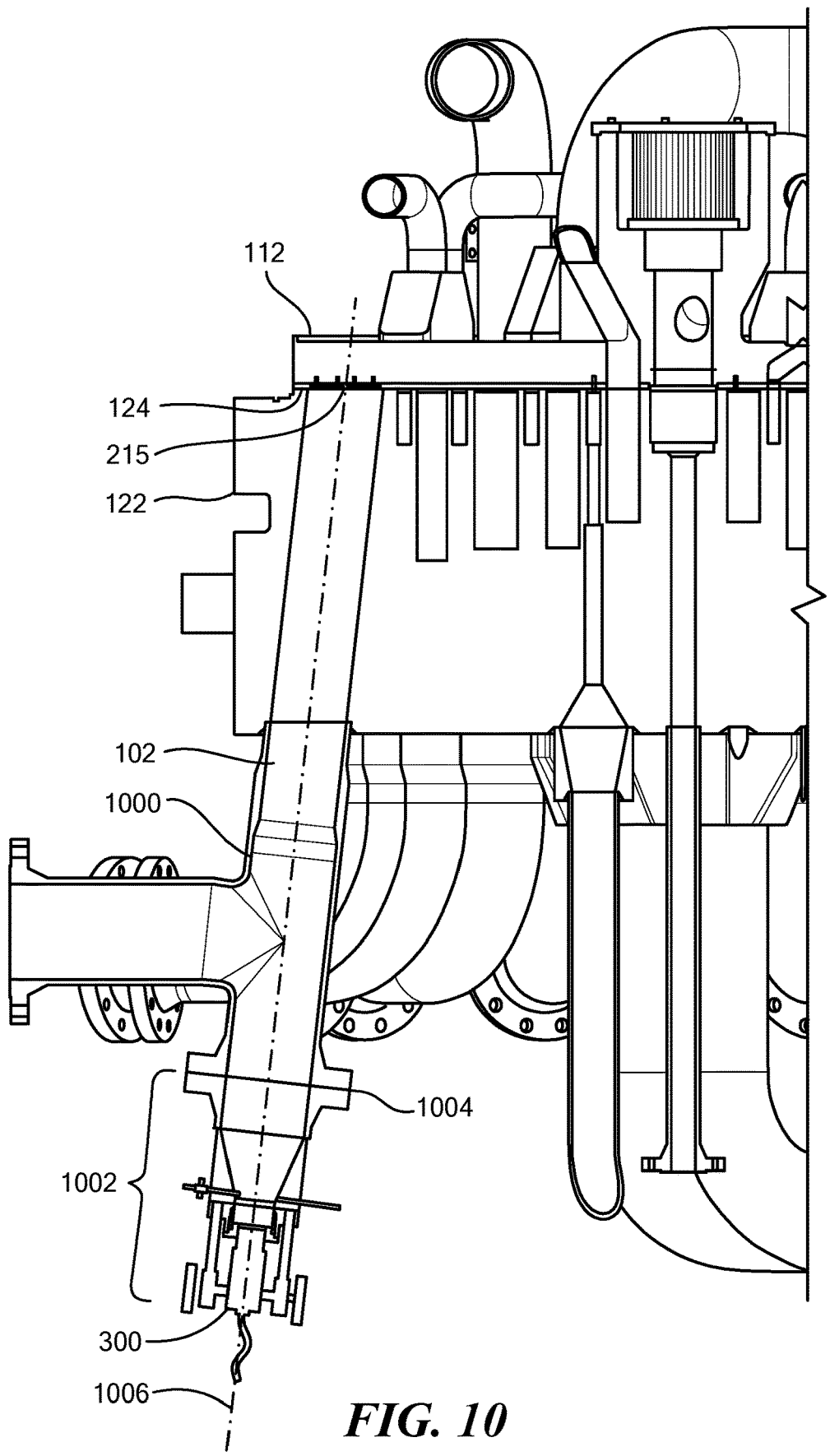
FIG. 10 is a cut-away view of a portion of the rotary valve of FIG. 1, including a digital camera or other sensor (without an optional safety ball valve), according to an embodiment of the present invention.

As noted, wear and tear to the seal sheet 124 disposed between the rotor plate 112 and the track plate 122 can prevent proper fluid control within the rotary valve. However, the working surface of the seal sheet 124 is not visible from the sight glass 304 and, thus, cannot be visually inspected via the sight glass 304. To alleviate this problem, as shown in FIG. 10, some embodiments include a digital camera 300 or other sensor attached to one of the pipes that terminates at the rotary valve 100, for example pipe 102. An optional T-connector 1000 may be used to plumb the sensor 300 to the pipe 102. For example, a camera assembly 1002 may be attached to the T-connector 1000 via a flange 1004.

Figure 11:
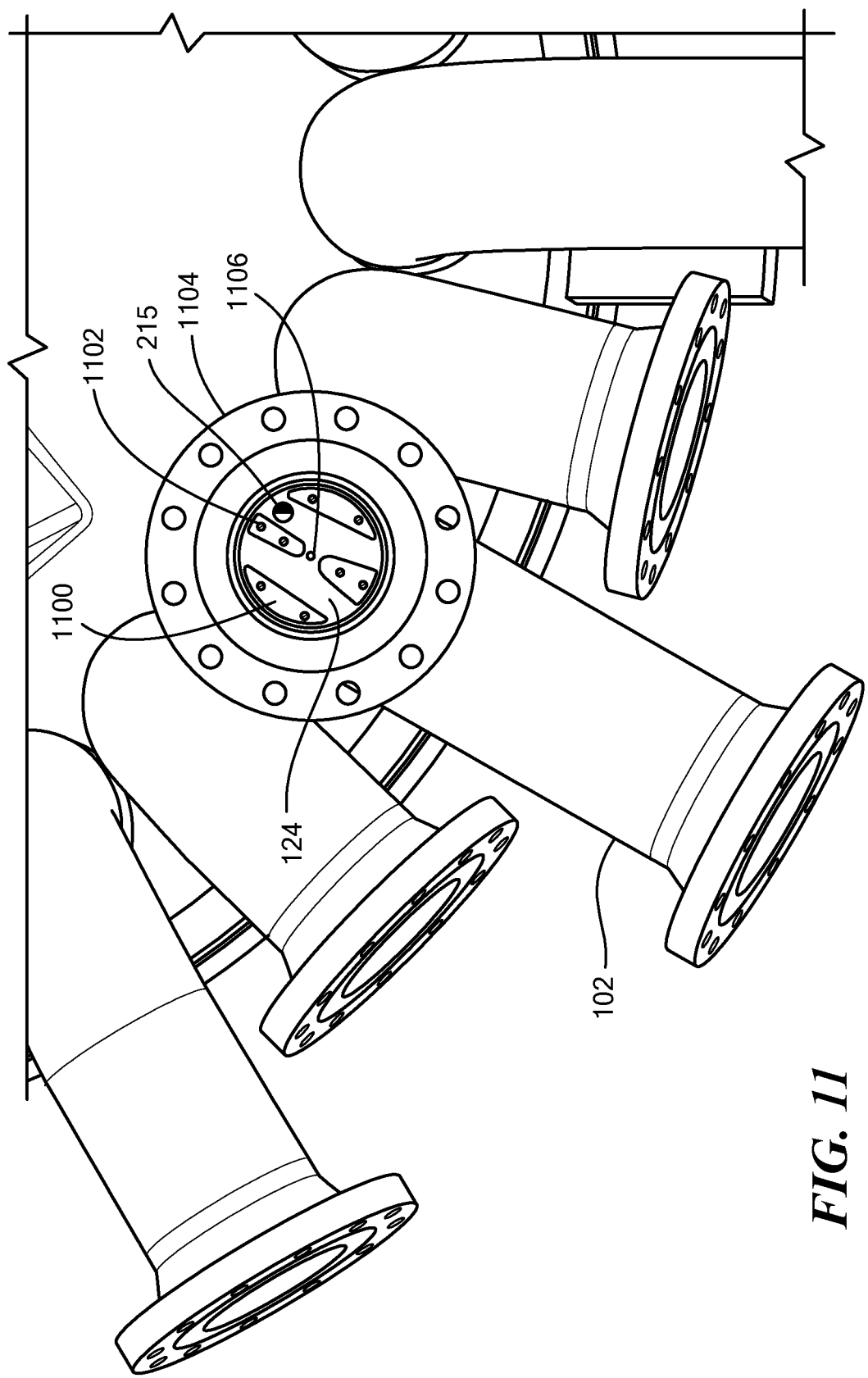
FIG. 11 is a view from below the rotary valve of FIG. 10, with the camera or other sensor removed for clarity, showing a view (through a T-port attached to an angled pipe) of a bottom of the rotor plate of FIG. 1, according to an embodiment of the present invention.

FIG. 11 provides an exemplary view up through the pipe 102, as visible to the camera 300. FIG. 11 shows the rotor plate 112 positioned to close off the pipe 102. Thus, the bottom of the rotor plate 112 and/or the bottom surface of the seal sheet 124 is visible through the pipe 102. Also visible in this particular view and rotational position of the rotor plate 112 are several segmented washers, represented by segmented washer 1100, attached to the bottom of the rotor plate 112 by screws, represented by screw 1102. The segmented washers 1100 and screws 1102 secure the seal sheet 124 to the bottom of the rotor plate 112. If the bottom of the seal sheet 124 or the bottom of the rotor plate 112 includes a fiducial mark, such as fiducial mark 215 (FIG. 2), and the rotor plate 112 is suitably rotationally positioned, the fiducial mark 215 can be visible through the pipe 102, as shown in FIG. 11.

Figure 20:
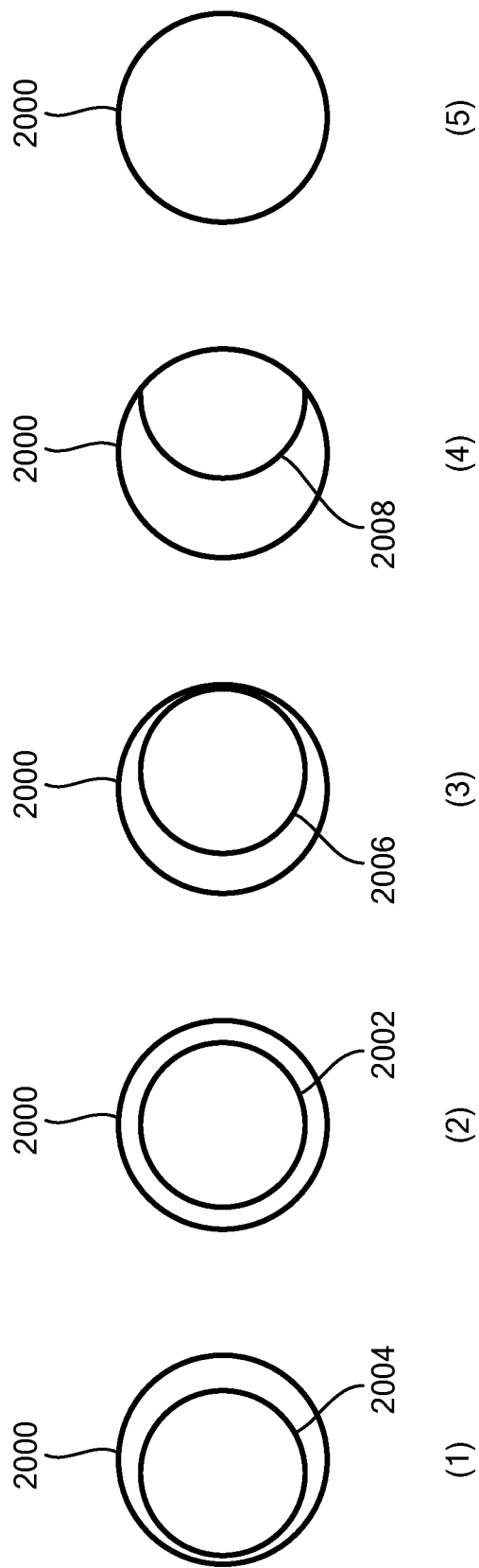
FIG. 20 shows five other exemplary views from below the rotary valve of FIG. 10, similar to FIG. 11, except at other respective rotational positions of the rotor plate, according to an embodiment of the present invention.

FIG. 20 provides five other exemplary views up through the pipe 102, at respective rotational positions of the rotor plate 112, as visible to the camera 300. In FIG. 20 (2), the rotor plate 112 is rotationally positioned such that an aperture 2000 (such as aperture 128 or 132 in FIGS. 1 and 17) in the track plate 122 is well aligned with an aperture 2002 in the rotor plate 112, as indicated by the apertures 2000 and 2002 being concentric. In FIGS. 20 (1), (3) and (4), the apertures 2000 and 2002 are not well aligned, as indicated by lack of concentricity of the apertures 2000 and 2002. In FIG. 20 (5), the apertures 2000 and 2002 are not aligned at all, and the rotor plate 112 closes off the aperture 2000 in the track plate 122, as indicated by absence of the aperture 2002 from the view.

Returning to FIG. 10, the digital camera 300 is oriented to image a fiducial mark 215 through the pipe 102. In these embodiments, the fiducial mark 215 can be disposed on a bottom surface of the rotor plate 112 or the bottom of the seal sheet 124. The bottom of the rotor plate 112 or the seal sheet 124 can have one or more fiducial marks 215 thereon. For example, the bottom of the rotor plate 112 or the seal sheet 124 can be engraved or otherwise marked to create the fiducial mark(s) 215. Optionally or alternatively, as discussed with respect to FIGS. 20 (1)-(5), at least a portion of one or more of the apertures 132-134 (FIG. 1) through the rotary plate 112 may be used as the fiducial mark(s) 215. For example, an edge of the aperture 132 may be used as the fiducial mark 215. For example, the rotor plate 112 can be considered well aligned with the track plate 122 when the aperture 132 in the rotor plate 112 is concentric with the corresponding aperture 128 in the track plate 122. In other respects, descriptions of fiducial marks 214-218 are applicable, mutatis mutandis, to the fiducial mark(s) 215.

Figure 12:
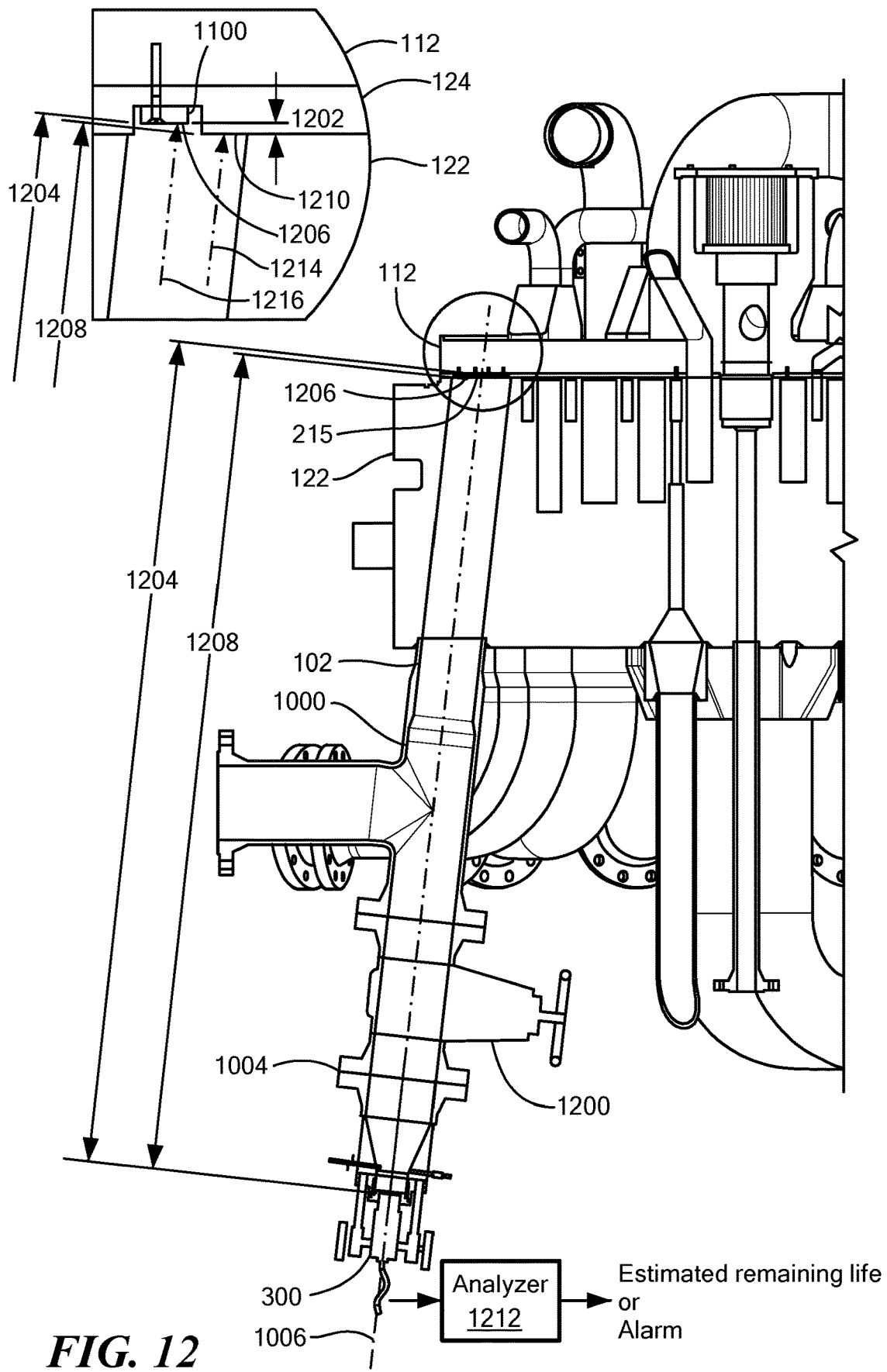
FIG. 12 is similar to FIG. 10, except with addition of an optional valve, according to an embodiment of the present invention.

Optionally, as shown in FIG. 12, a shut-off valve 1200 may be disposed in fluid communication between the digital camera 300 or other sensor and the track plate 122.

In some cases, for example as shown in FIGS. 10 and 12, the portion of the pipe 102, through which the camera 300 images the bottom of the rotor plate 112, is straight, and the camera 300 is oriented essentially coaxially 1006 with the pipe 102, all the way to the bottom of the rotor plate 112. In these cases, a distance between the camera 300 and the bottom of the rotor plate 112 can be arbitrary, at least with respect to the camera's field of view.

Figure 13:
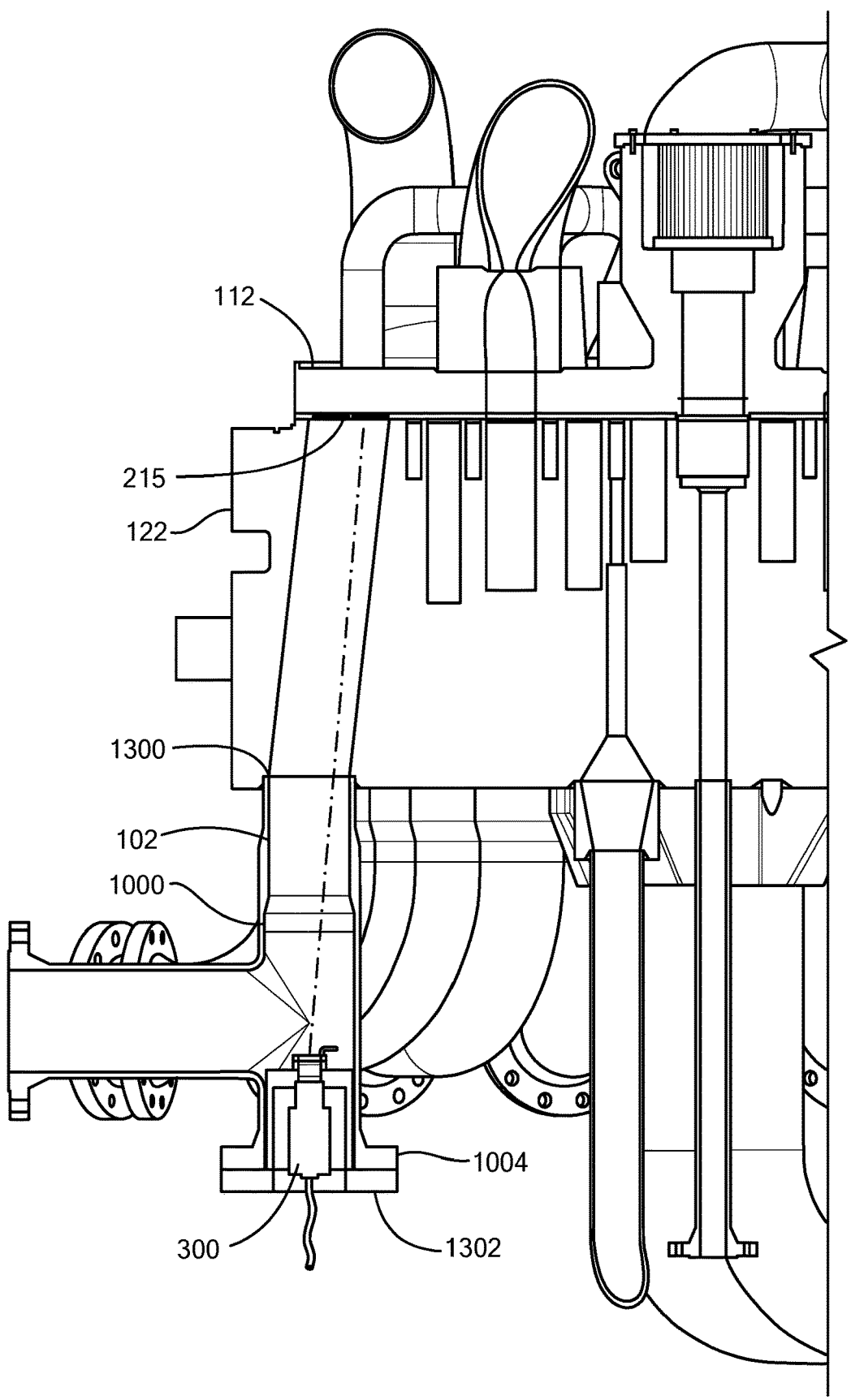
FIG. 13 is similar to FIGS. 10 and 12, except without an angled T-port and addition of a T-plug to reduce distance between the camera or other sensor and the bottom of the rotor plate, according to an embodiment of the present invention.
Figure 14:
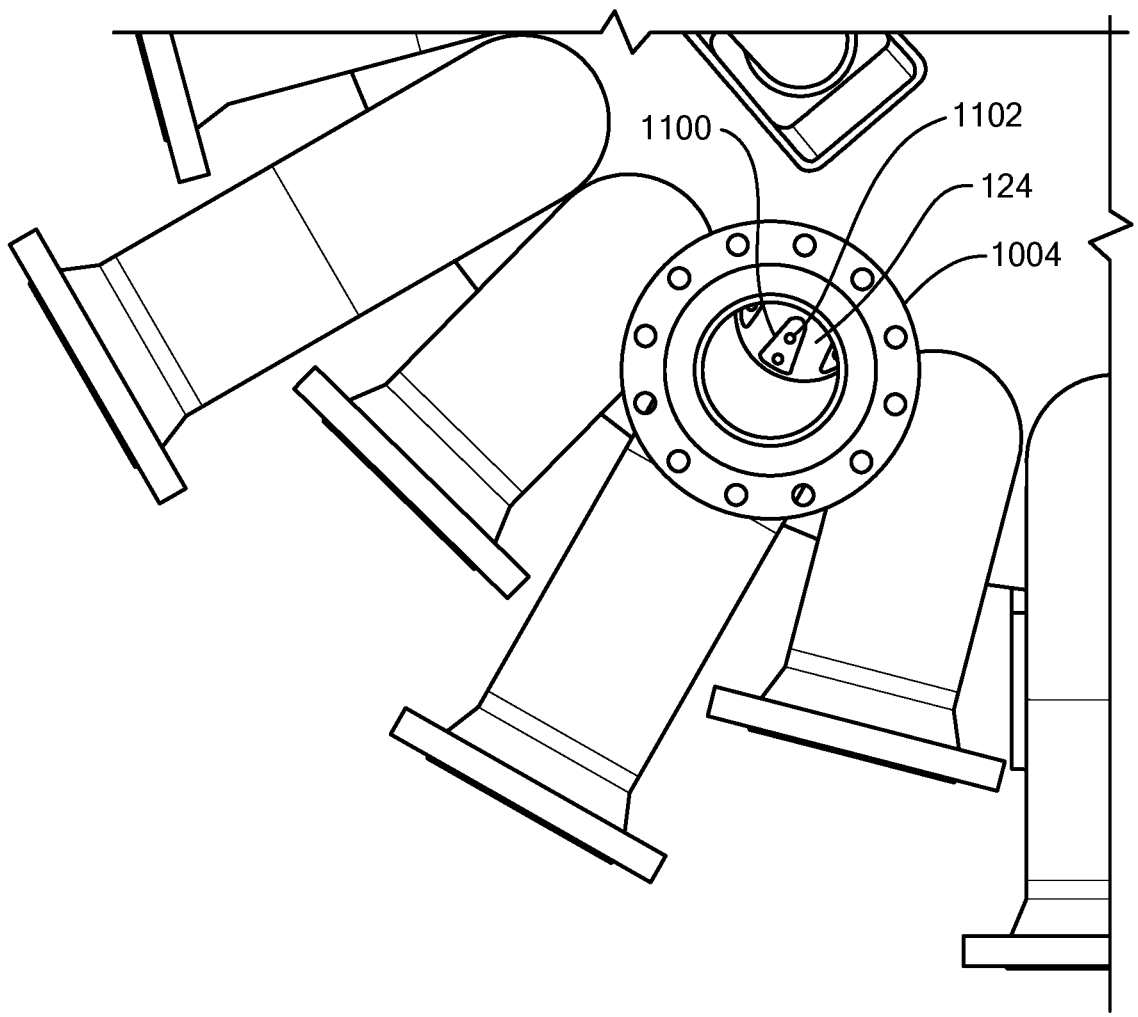
FIG. 14 is similar to FIG. 11, except in relation to the embodiment shown in FIG. 13, according to an embodiment of the present invention.
Figure 15:
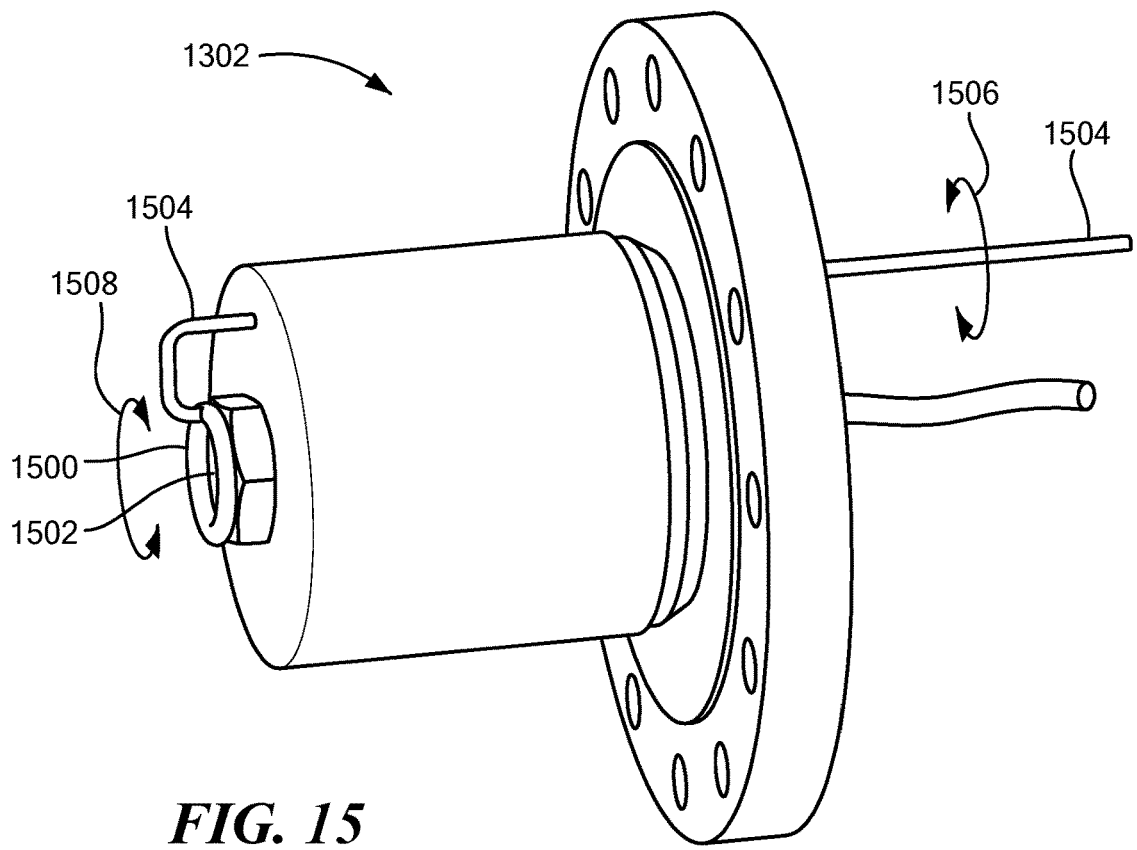
FIGS. 15 and 16 are respective perspective and cut-away views of the T-plug of FIG. 13, according to an embodiment of the present invention.
Figure 16:
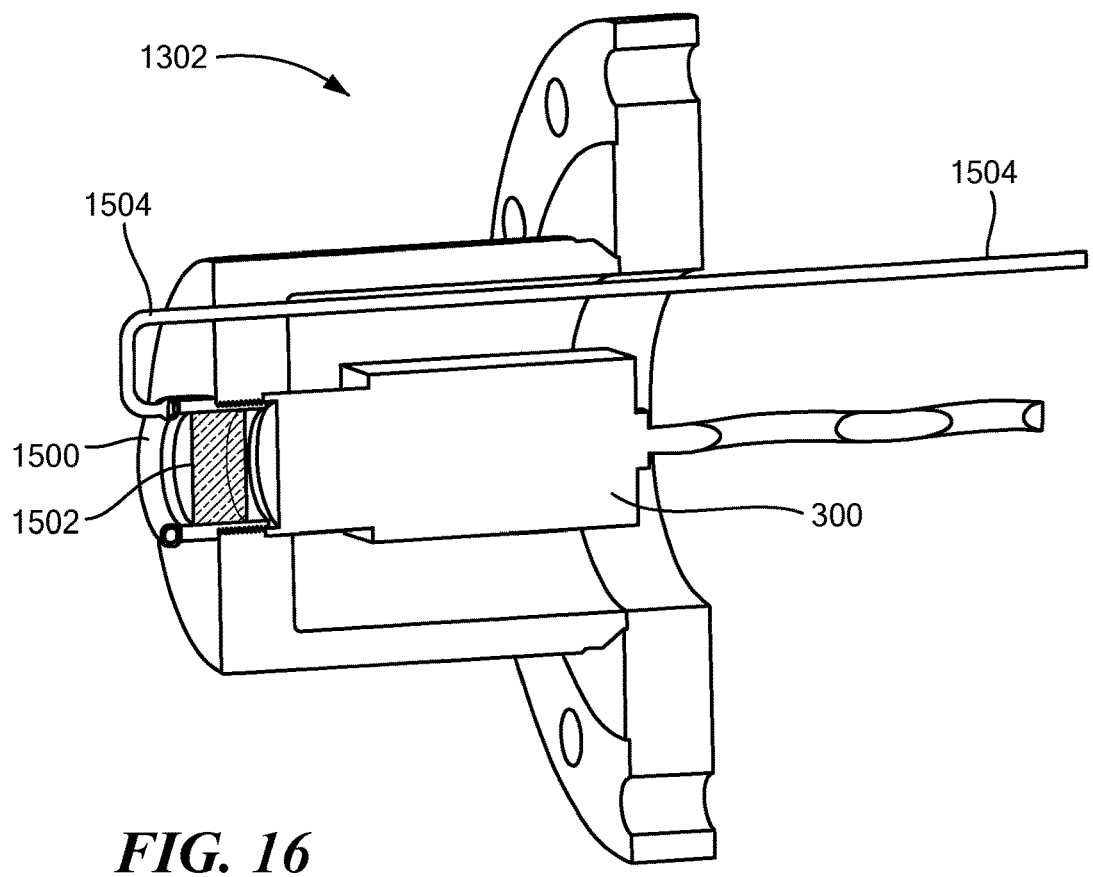

However, in other cases, exemplified in FIG. 13, the pipe 102 is straight, while a port hole through the track plate 122 is angled, for example at 1300. In these cases, the camera's distance from the bottom of the rotor plate 112 is limited by the angle 1300. If the camera 300 is disposed too far from the bottom of the rotor plate 112, the angle 1300 obscures at least a portion of the camera's view of the fiducial mark 215, as exemplified in FIG. 14. Contrast the view of the bottom of the rotor plate 112 shown in FIG. 11 with the view shown in FIG. 14. In these cases, the camera 300 can be attached to a T-plug 1302 (FIG. 13), which disposes the camera 300 or other sensor inward of the flange 1004 and, therefore, reduces the distance between the camera 300 or other sensor and the bottom of the rotor plate 112. The camera's or other sensor's view of the bottom of the rotor plate 112 or the seal sheet 124 may be partially obscured. However, the embodiments described herein may function correctly, even with only a partial view of the aperture in the bottom of the rotor plate 112. FIGS. 15 and 16 provide respective perspective and cut-away views of one embodiment of the T-plug 1302.

FIGS. 15 and 16 also shows an optional scrubber 1500 disposed on or proximate a surface of a sight glass 1502. The sight glass 1502 is disposed between the digital camera or other sensor 300 and the fiducial mark 215. The scrubber 1500 is disposed on the surface of the sight glass 1502 opposite the digital camera 300. In one embodiment, the scrubber 1500 includes a perforated pipe configured to spray a fluid on the sight glass 1502 to remove debris from the sight glass 1502. The perforated pipe 1500 may be plumbed via a pipe 1504 to a pressurized supply of the fluid. In another embodiment, the scrubber 1500 includes a rod and is attached to a rod 1504, which extends external the rotary valve 100. Movement of the rod 1504, such as movement suggested by double-headed arrow 1506, causes movement of the scrubber 1500 parallel to the sight glass 1502, as suggested by double-headed arrow 1508. The movement 1508 of the scrubber 1500 cleans the sight glass 1502.

In some embodiments, as show in FIG. 12, the camera or other sensor 300 is used to measure a remaining usable thickness 1202 of the seal sheet 124. An upper-left portion of FIG. 12 contains an enlarged view of a circled portion of the rotary valve 100. The useable thickness 1202 may be a distance from the bottom surface of the seal sheet 124 to a bottom surface of a segmented washer 1100 or another recessed component. As the seal sheet 124 wears, the seal sheet 124 becomes thinner. Once the entire usable thickness 1202 of the seal sheet 124 has worn away, the seal sheet 124 should be replaced.

Some embodiments ascertain the remaining usable thickness 1202 by: (a) measuring a first distance 1204 between the sensor 300 and a first portion 1206 of the rotary valve 100, such as the bottom surface of the segmented washer 1100, (b) measuring a second distance 1208 between the sensor 300 and a second portion 1210 of the rotary valve 100, such as the bottom surface of the seal sheet 124, and (c) subtracting the second distance 1208 from the first distance 1204. The difference between the first and second distances 1204 and 1208 is exaggerated in the main portion of FIG. 12 for clarity. If the second distance 1208 is accurately predicable, the second distance 1208 need not be measured. In this case, only the first distance 1204 needs to be measured and subtracted from the predicted second distance 1208 to determine the remaining usable thickness 1202.

An analyzer 1212 monitors the distances 1204 and 1208 (or only the first distance 1204, as discussed above), calculates the remaining usable thickness 1202, and outputs the remaining useful thickness 1202 or an estimate of the remaining life of the seal sheet 124. The remaining life may be estimated according to an equation, such as:

$$\text{Remaining Life \%} = \left( \frac{\text{First Distance} - \text{Second Distance}}{\text{Initial Usable Thickness}} \right) \times 100 \quad (1)$$

The analyzer 1212 can raise an alarm if the remaining useful thickness 1202 or estimated remaining life decreases below a predetermined value, such as about 0.100 inches (2.54 mm) or 5%, respectively.

If a foreign object becomes trapped between the seal sheet 124 and the track plate 122, the first and/or second distance 1204 and 1208 increases. The analyzer 1212 can raise an alarm if either the first or second distance 1204 or 1208 increases unexpectedly, indicating a likely intrusion of a foreign object.

The analyzer 1212 may be implemented by a processor executing instructions stored in a memory, along the lines described with respect to FIG. 9.

Optionally or alternatively, the first portion 1206 may be a fiducial 215 or any convenient feature that can be targeted by the sensor 300. For example, in some embodiments, the first portion 1206 (FIG. 12) is a vent hole 1106 (FIG. 11) defined in the seal sheet 124. In some embodiments, one or more of the screws 1102 may be used as the first portion 1206. In some embodiments, the first portion 1206 is a feature of an interior of a cross-over pipe 136, 204, 206, 208, 210 and/or 212. The second portion 1210 can be any portion of the rotary valve 100 that, when compared to the first portion 1206, indicates an amount of remaining usable thickness 1202 of the seal sheet 124.

A digital camera 300, or two separate cameras (not shown), may be used to measure the distances 1204 and 1208, such as by automatically adjusting focus of a lens until the respective portion 1206 or 1210 is well focused and then reading the distance 1204 or 1208 from the lens. In another embodiment, one or two stereo cameras 300 are used to measure the distances 1204 and 1208. In some embodiments, one or two ultrasonic distance sensors 300, one or two LiDAR distance sensors 300 or some other suitable sensor or sensor pair is used to measure the distances 1204 and 1208 or only the first distance 1204. Exemplary beams from LiDARs or ultrasonic sensors 300 are indicated at 1214 and 1216.

Optionally or alternatively, an image of the bottom of the seal sheet 124 may be displayed on a display screen 144, similar to the fiducial display discussed with respect to FIG. 1.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation. All or a portion of each block, module, operation, step or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The controller 150, etc. or portions thereof may be implemented by one or more suitable processors executing, or controlled by, instructions stored in a memory. Each processor may be a general-purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), non-volatile memory (NVM), non-volatile random access memory (NVRAM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, database schemas and the like, systems may be embodied using a variety of data structures, schemas, etc.

Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A multi-position rotary valve for selectively fluidically interconnecting subsets of pipes terminating at the rotary valve, the rotary valve comprising:

a track plate that defines a plurality of apertures therethrough, one side of each aperture being configured to be fluidically connected to a respective one of the pipes;

a pressure-tight housing attached to the track plate to define a volume therebetween;

a rotor plate disposed in the volume, counterfacing the track plate, defining a plurality of apertures therethrough, and configured to rotate about an axis such that at respective rotational positions, respective sets of the apertures through the rotor plate fluidically align with respective sets of the apertures through the track plate;

a seal sheet disposed between the track plate and the rotor plate and configured to maintain fluid-tight contact therebetween;

a cross-over pipe disposed within the volume and attached to the rotor plate for rotation therewith, each end of the cross-over pipe being fluidically connected to one side of a respective aperture through the rotor plate, wherein the volume is sufficient for movement of the cross-over pipe as the rotor plate rotates 360 degrees;

a driver;

an elongated shaft having a first end coupled to the driver and a second end coupled to the rotor plate, wherein the driver is configured to index the rotor plate, via the shaft;

a fiducial mark, disposed within the pressure-tight housing, attached to the rotor plate and/or the cross-over pipe, and configured for rotation with the rotor plate;

a transparent port defined in the housing; and a digital camera disposed outside the pressure-tight housing and configured to image the fiducial mark through the port at at least one rotational position of the rotor plate and, thereby, to detect rotational position of the rotor plate.

2. A multi-position rotary valve according to claim 1, further comprising a display screen remote from the rotary valve, communicably coupled to the digital camera, and configured to display an image generated by the digital camera.

3. A multi-position rotary valve according to claim 1, wherein the digital camera is configured to detect a degree of alignment of one of the track plate apertures with one of the rotor plate apertures.

4. A multi-position rotary valve according to claim 1, further comprising:

a driver configured to rotate the rotor plate; and a closed-loop controller coupled to the digital camera and to the driver and configured to control operation of the driver in response to a signal from the digital camera.

5. A multi-position rotary valve for selectively fluidically interconnecting subsets of pipes terminating at the rotary valve, the rotary valve comprising:

a track plate that defines a plurality of apertures therethrough, one side of each aperture being configured to be fluidically connected to a respective one of the pipes;

a pressure-tight housing attached to the track plate to define a volume therebetween;

a rotor plate disposed in the volume, counterfacing the track plate, defining a plurality of apertures therethrough, and configured to rotate about an axis such that at respective rotational positions, respective sets of apertures through the rotor plate fluidically align with respective sets of the apertures through the track plate;

a seal sheet disposed between the track plate and the rotor plate and configured to maintain fluid-tight contact therebetween;

a cross-over pipe disposed within the volume and attached to the rotor plate for rotation therewith, each end of the cross-over pipe being fluidically connected to one side of a respective aperture through the rotor plate, wherein the volume is sufficient for movement of the cross-over pipe as the rotor plate rotates 360 degrees;

a driver;

an elongated shaft having a first end coupled to the driver and a second end coupled to the rotor plate, wherein the driver is configured to index the rotor plate, via the shaft;

a fiducial mark, disposed within the pressure-tight housing, attached to the rotor plate and/or the cross-over pipe, and configured for rotation with the rotor plate; and a digital camera disposed outside the pressure-tight housing and configured to image the fiducial mark through a bore of one of the pipes terminating at the rotary valve.

6. A multi-position rotary valve according to claim 5, wherein the digital camera is configured to detect a degree of alignment of one of the track plate apertures with one of the rotor plate apertures.

\* \* \* \* \*